United States Patent
Esteves Tavora et al.

(10) Patent No.: US 11,757,547 B1
(45) Date of Patent: Sep. 12, 2023

(54) ACTIVE INDUCTOR IMPLEMENTATION IN A COMMUNICATION SYSTEM

(71) Applicant: Infineon Technologies Austria AG, Villach (AT)

(72) Inventors: Filipe Esteves Tavora, Villach (AT); Thomas Ferianz, Bodensdorf (AT); Gernot Kasebacher, Treffen (AT)

(73) Assignee: Infineon Technologies Austria AG, Villach (AT)

(*) Notice: Subject to any disclaimer, the term of this patent is extended or adjusted under 35 U.S.C. 154(b) by 0 days.

(21) Appl. No.: 17/687,988

(22) Filed: Mar. 7, 2022

(51) Int. Cl.
  H04B 17/364 (2015.01)

(52) U.S. Cl.
  CPC .................. H04B 17/364 (2015.01)

(58) Field of Classification Search
  CPC .... H04B 17/364; H04B 17/318; H04B 17/30; H04B 17/309; H04B 17/00; H04B 17/101; H04B 17/18
  See application file for complete search history.

(56) References Cited

U.S. PATENT DOCUMENTS

| | | | |
|---|---|---|---|
| 2005/0189997 A1* | 9/2005 | Razafimandimby | H03L 5/00 331/16 |
| 2018/0102921 A1* | 4/2018 | Kim | H04L 25/026 |
| 2022/0123196 A1* | 4/2022 | Lesso | H10N 30/804 |

* cited by examiner

Primary Examiner — Khanh C Tran
(74) Attorney, Agent, or Firm — Armis IP Law, LLC

(57) ABSTRACT

An example apparatus as discussed herein includes a first communication circuit and a second communication circuit. A communication link couples the first communication circuit and the second communication circuit. The communication link conveys signals between the first communication circuit and the second communication circuit. The first communication circuit includes a first active inductor set to a first inductance; the first inductance controls a resonant frequency (carrier frequency) of communicating signals from the first communication circuit. The second communication circuit includes a second active inductor set to a second inductance. The second inductance controls a frequency response (such as band-pass resonant frequency) of a band-pass filter in the second communication circuit. The setting of the first inductance and the second inductance aligns the resonant frequency of the transmitted signals with respect to a peak or center frequency passed by the band-pass filter.

20 Claims, 21 Drawing Sheets

ACTIVE INDUCTOR IMPLEMENTATION IN A COMMUNICATION SYSTEM

BACKGROUND

One of the main challenges in digital isolator architectures is the capability to withstand fast common mode surges across the galvanic barrier, a figure of merit known as Common Mode Transient Immunity (CMTI). Capacitive coupled digital isolators offer a better area usage while presenting a worse CMTI performance when compared to their inductively coupled counterpart. For this reason, improving the CMTI in capacitive coupled architectures is desirable.

Most commercial solutions of such architectures employ the use of blanking times to mask disturbances created by CMT events. This blanking time is added to the whole chain propagation delay of the system and is effective as long as the event duration is shorter than the blanking time. Other known solutions involve the use of passive High Pass filters to eliminate disturbances below the carrier frequency on OOK modulations but are sensitive to high-frequency interferences which could be mixed down into the signal frequency when trying to detect the signal envelope. Moreover, a passive filter attenuates the signal which makes its demodulation even harder, so to compensate for this attenuation a pre-amplifier is required as the first block in the receiver chain. Any block placed directly connected to the isolation capacitor requires extra consideration with regards to CMT events and the associated displacement current it generates, which increases the complexity of its design.

BRIEF DESCRIPTION

In contrast to conventional techniques, this disclosure includes novel ways of supporting communications between communication nodes. For example, the disclosure herein includes the use of active inductors to implement an LC-oscillator on the transmitter side and a band-pass filter on the receiver side of a communication system.

In one communication system, a substantially same active-LC structure (such as an active inductor) is implemented on both transmitter and receiver, resulting in the same resonant frequency behavior over process and temperature being achieved on both sides. Such substantial matching of active inductors maximizes the signal to noise/interference ratio at the output of the filter, which makes the communication system more robust and faster since it doesn't require blanking time blocks and its associated extra propagation delay time.

More specifically, the disclosure herein includes an apparatus including a first communication circuit and a second communication circuit. A communication link couples the first communication circuit and the second communication circuit. The communication link conveys signals between the first communication circuit and the second communication circuit. The first communication circuit includes a first active inductor set to a first inductance; the first inductance controls a resonant frequency (carrier frequency) of communicating signals from the first communication circuit over the communication link to the second communication circuit. The second communication circuit includes a second active inductor set to a second inductance. The second inductance controls a frequency response of a band-pass filter in the second communication circuit. Selection of the settings of the first inductance and the second inductance aligns the resonant frequency of the transmitted signals with respect to a peak or center frequency of signals passed by the band-pass filter.

In one implementation, the second inductance (such as associated with the second active inductor) substantially matches the first inductance (such as associated with the first active inductor). The matching of the settings of the first inductance and the second inductance aligns the resonant frequency of the transmitted signals with respect to a peak or center frequency of signals passed by the band-pass filter.

The first communication circuit may be configured as a first semiconductor chip. The first active inductor may include a first capacitor disposed on the first semiconductor chip. The second communication circuit can be configured as a second semiconductor chip. The second active inductor may include a second capacitor disposed on the second semiconductor chip.

Settings of the first inductance and the second inductance can be achieved in any suitable manner. For example, the first active inductor may be fabricated to provide the first inductance value via trimming of at least one component in the first active inductor. The second active inductor may be fabricated to provide the second inductance value via trimming of at least one component in the second active inductor.

In still further instances of the communication system as described herein, a length of the communication link disposed between the first communication circuit and the second communication circuit may be less than Y inches or any other suitable value, where Y is a value such as ¼, ½, ¾, 1, 2, 3, 4, 5, 6, 7, 8, 9, 10, etc. The length of the communication link can be greater than Y as well.

As previously discussed, the first inductance of the first active inductor may define a first resonant frequency of a first resonant circuit path coupled to the communication link in the first communication circuit. Further, the second inductance of the second active inductor may define a second resonant frequency (such as a bandpass resonant frequency) of a second resonant circuit path coupled to the communication link in the second communication circuit. The magnitude of the first resonant frequency may be set or trimmed to be within X % of a magnitude of the second resonant frequency, where X is any suitable value such as ¼, ½, ¾, 1, 2, 3, 4, 5, 6, 7, 8, 9, 10, etc.

Each of the active inductors as described herein can be configured in any suitable manner. For example, the first active inductor can be configured to include a first set of transconductance amplifiers to provide the first inductance; the second active inductor can be configured to include a second set of transconductance amplifiers to provide the second inductance.

As previously discussed, the first communication circuit and the second communication circuit are part of a respective communication system. The first communication circuit and the second communication circuit may be coupled to a common substrate.

Note further that the first communication circuit and corresponding circuit components including the first active inductor may be galvanically isolated with respect to the second communication circuit and corresponding circuit components including the second active inductor. The galvanic isolation allows the circuits to operate at different ground references, yet the first communication circuit and the second communication circuit can still communicate with each other even during transient conditions when the grounds are substantially different and change over time with respect to each other.

As previously discussed, the communication link supports conveyance of signals including data. The first communication circuit may be or include a transmitter operative to transmit the signals over the communication link; the second communication circuit may be or include a receiver operative to receive the signals over the communication link.

The signals conveyed over the communication link may be differential signals. For example, the communication link may include a pair of conductive paths extending between the first communication circuit and the second communication circuit. The pair of conductive paths convey the differential signals (including a respective data). The pair of conductive paths may include a first conductive path and a second conductive path extending between the first communication circuit and the second communication circuit. The first inductance (and corresponding first active inductor) and the second inductance (and corresponding second active inductor) may be disposed in series along the first conductive path.

In a further example of the communication system, the first communication circuit includes a third active inductor set to a third inductance; the second communication circuit includes a fourth active inductor set to a fourth inductance; the fourth inductance is substantially matched to the third inductance. The third inductance and the fourth inductance may be disposed in series along the second conductive path.

This disclosure further includes implementation of one or more methods. For example, a fabricator of the communication system as described herein couples a first communication circuit and the second communication circuit via a communication link. The first communication circuit is fabricated to include a first active inductor; the second communication circuit is fabricated to include a second active inductor. The fabricator or other suitable entity sets a first inductance of the first active inductor to be substantially matched a second inductance of the second active inductor.

Additionally or alternatively, the fabricator can be configured to set a first inductance of a first active inductor disposed in the first communication circuit, the first inductance controls a resonant frequency of communicating the signals from the first communication circuit to the second communication circuit. The fabricator sets a second inductance of a second active inductor disposed in the second communication circuit, the second inductance sets a frequency response of a band-pass filter in the second communication circuit that receives the signals.

Setting of the first inductance and the second inductance can be achieved in any suitable manner. For example, the fabricator or other suitable entity may trim at least one component in the first active inductor to set the first active inductor to a first inductance value; the fabricator or other suitable entity may trim at least one component in the second active inductor to set the second active inductor to a second inductance value.

In still further instances of the communication system as described herein, a length of the communication link disposed between the first communication circuit and the second communication circuit may be less than Y inches or any other suitable value, where Y is a value such as ¼, ½, ¾, 1, 2, 3, 4, 5, 6, 7, 8, 9, 10, etc.

As a further example, the fabricator or other suitable entity couples the first communication circuit and the second communication circuit to a common substrate.

Further, the fabricator or other suitable entity may provide galvanic isolation of the first communication circuit including the first active inductor with respect to the second communication circuit including the second active inductor.

Note again that implementation of one or more active inductors and substrate matching of same in a communications system as discussed herein may provide beneficial operations such as increasing the signal to noise/interference ratio at the output of a respective filter, which makes the communication system more robust and faster since it doesn't require blanking time blocks (such as times when data cannot be transmitted) and its associated extra propagation delay time.

These and other more specific concepts are disclosed in more detail below.

As discussed herein, techniques herein are well suited for use in the field of communications. However, it should be noted that this disclosure is not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be implemented and viewed in many different ways.

Also, note that this preliminary discussion herein (BRIEF DESCRIPTION) purposefully does not specify every implementation and/or incrementally novel aspect of the present disclosure or claimed invention(s). Instead, this brief description only presents general implementations and corresponding points of novelty over conventional techniques. For additional details and/or possible perspectives (permutations) of the invention(s), the reader is directed to the Detailed Description section (which is a summary of possible implementation and operations) and corresponding figures of the present disclosure as further discussed below.

Figure 1:
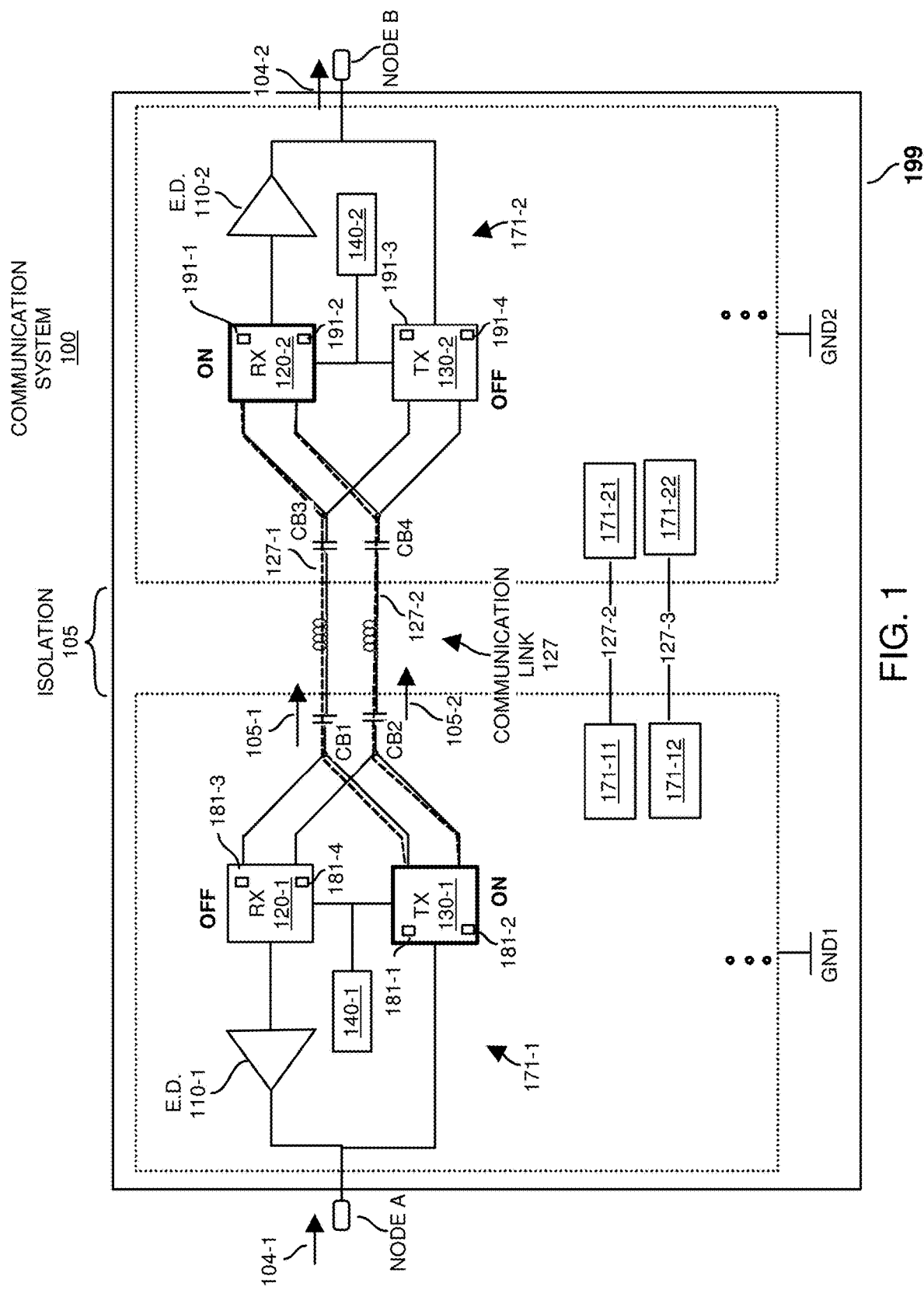
FIG. 1 is an example general diagram of a communication system and corresponding transmitter receiver pairs operating in first data flow mode as disclosed herein.

The foregoing and other objects, features, and advantages of the invention will be apparent from the following more particular description of preferred implementations herein, as illustrated in the accompanying drawings in which like reference characters refer to the same parts throughout the different views. The drawings are not necessarily to scale, with emphasis instead being placed upon illustrating the implementations, operations, principles, concepts, etc.

DETAILED DESCRIPTION

An example apparatus as discussed herein includes a first communication circuit and a second communication circuit. A communication link couples the first communication circuit and the second communication circuit. The communication link conveys signals between the first communication circuit and the second communication circuit. The first communication circuit includes a first active inductor set to a first inductance; the first inductance controls a resonant frequency (carrier frequency) of communicating signals from the first communication circuit. The second communication circuit includes a second active inductor set to a second inductance. The second inductance controls a frequency response (such as band-pass resonant frequency) of a band-pass filter in the second communication circuit. The setting of the first inductance and the second inductance may be set to align the resonant frequency of the transmitted signals with respect to a peak or center frequency passed by the band-pass filter.

Now, more specifically, FIG. 1 is an example general diagram of a communication system and corresponding transmitter receiver pair operating in a first data flow mode (downstream) as disclosed herein.

As shown, the communication system 100 includes communication circuit 171-1 (transceiver pair) and communication circuit 171-2 (transceiver pair) disposed on the substrate 199. Note that the implementation of substrate 199 is not necessary as the communication circuit 171-1 and the communication circuit 171-2 can be disparately located with respect to each other without being affixed to a common substrate 199.

Thus, the first communication circuit 171-1 and the second communication circuit 171-2 are part of a respective communication system 100. The first communication circuit 171-1 and the second communication circuit 171-2 may or may not be coupled to a common substrate 199.

Each of the communication circuit 171-1 and the communication circuit 171-2 include multiple components supporting conveyance of the data between each other. For example, the communication circuit 171-1 includes controller 140-1. The controller 140-1 controls whether the communication circuit 171-1 is set to a transmitter mode of communicating data via signals 105 to the communication circuit 171-2 or whether it is set to a receiver mode of receiving data from the communication circuit 171-2.

Similarly, the communication circuit 171-2 includes controller 140-2. The controller 140-2 controls whether the communication circuit 171-2 is set to a transmitter mode of communicating data via signals to the communication circuit 171-1 or whether it is set to a receiver mode of receiving data from the communication circuit 171-1.

In FIG. 1, the controller 140-1 controls the transmitter 130-1 and corresponding circuitry to be in an ON-state while controller 140 controls the receiver 120-1 and corresponding circuitry to be in an OFF-state. This causes the communication circuit 171-1 to be set to a transmitter mode of communicating data to the communication circuit 171-2.

Further in FIG. 1, the controller 140-2 controls the transmitter 130-2 and corresponding circuitry to be in an OFF-state while the controller 140 controls the receiver 120-2 and corresponding circuitry to be in an ON-state. This causes the communication circuit 171-2 to be set to a receiver mode of receiving data from the communication circuit 171-1.

During operation in a downstream mode (FIG. 1) from the communication circuit 171-1 to the communication circuit 171-2, the communication circuit 171-1 receives signal 104-1 at node A. Via the active inductor 181-1 and other circuitry, the transmitter 130-1 converts the received input signal 104-1 into signal 105-1 communicated over the communication path 127-1 to the receiver 120-2. Communication path 127-1 includes series disposed DC blocking capacitor CB1 and DC blocking capacitor CB3. As their name suggests, these blocking capacitors allow the AC component of the signal 105-1 transmitted by the transmitter 130-1 to pass along the communication path 127-1 to the receiver 120-2. As further illustrated, the communication path 127-1 may include some amount of parasitic inductance.

In general, the active inductor 181-1 controls a respective resonant frequency (or carrier frequency) of a modulated signal derived from the input signal 104-1; such a signal is communicated as signal 105-1 over the communication path 127-1. The receiver 120-2 includes a respective bandpass filter through which the received signal 105-1 passes to the envelope detector 110-2. The inductance of the active inductor 191-1 controls respective settings of the bandpass filter. In one implementation, it is desired that the carrier frequency of the signal 105-1 as controlled by the inductance setting of the active inductor 181-1 matches a peek bandpass carrier frequency disposed in the receiver 120-2 to provide the best gain of the received signal. To this end, in one configuration, this disclosure includes substantially matching an inductance of the active inductor 181-1 to the inductance of the active inductor 191-1 to provide most efficient communications. Additional details of this concept are further discussed below.

As shown, the communication link 127 may be implemented as a differential communication link supporting differential signals. For example, the communication link 127 may include a pair of conductive paths (communication path 127-1 and communication path 127-2) extending between the first communication circuit 171-1 and the second communication circuit 171-2. Communication path 127-2 includes series disposed DC blocking capacitor CB2 and DC blocking capacitor CB4. As their name suggests, these blocking capacitors allow the AC component of the signal 105-2 transmitted by the transmitter 130-1 to pass along the communication path 127-2 to the receiver 120-2. As further illustrated, the communication path 127-2 may include some amount of parasitic inductance.

The pair of conductive paths convey the differential signals 105-1 and 105-2 (including a respective data is captured by the input signal 104-1). For example, the communication path 127-1 conveys the signal 105-1; the communication path 127-2 conveys the signal 105-2. Thus, communication link 127 may include a first conductive path and a second conductive path extending between the first communication circuit and the second communication circuit.

As further discussed herein, the first inductance of active inductor 181-1 and the second inductance of active inductor 191-1 may be disposed in series with respect to the serial circuit path including the transmitter 130-1, active inductor 181-1, communication link 127-1, receiver 120-2, active inductor 191-1, and envelope detector 110-2 extending between the node A and node B of the communication system 100.

In the second path of communication link 127, the active inductor 181-2 controls a respective resonant frequency (or carrier frequency) of a modulation signal 105-2 derived from the input signal 104-1; such a signal is communicated as signal 105-2 over the communication path 127-2. As further discussed herein, the receiver 120-2 includes a respective bandpass filter through which the received signal 105-2 passes to the envelope detector 110-2. The inductance of the active inductor 191-2 controls respective settings (such as a band-pass resonant frequency) of the bandpass filter that receives signal 105-2. In one implementation, it is desired that the carrier frequency of the signal 105-2 as controlled by the inductance setting of the active inductor 181-2 matches a peak bandpass carrier frequency disposed in the receiver 120-2 to provide the best gain of the received signal 105-2. As previously discussed, if desired, embodiments herein include substantially matching an inductance of the active inductor 181-2 to the inductance of the active inductor 191-2. Additional details of this concept are further discussed below. Similarly, the inductance of active inductor 181-2 and the inductance of active inductor 191-2 may be disposed in series with respect to the serial circuit path including the transmitter 130-1, active inductor 181-2, communication link 127-2, receiver 120-2, active inductor 191-2, and envelope detector 110-2 extending between the node A and node B of the communication system 100.

In accordance with further examples, the first communication circuit 171-1 and corresponding circuit components including respective active inductors may be galvanically isolated with respect to the second communication circuit 171-2 and corresponding circuit components including respective one or more active inductors. For example, the circuitry in communication circuit 171-1 may be referenced with respect to ground reference voltage/potential (GND1); the circuitry in communication circuit 171-2 may be referenced with respect to ground reference voltage/potential (GND2). Note that the different ground reference voltage potentials (i.e., GND1 versus GND2) are susceptible to experiencing large and/or frequent variations such as up to or greater than 500 volts. The configuration of the communication system 100 corresponding components supports robust communications even in conditions in which the communication circuitry experiences large differences between ground voltage potentials.

Note further that the communication link 127 can be implemented in any suitable manner. For example, the communication link 127 may be implemented via respective electrically conductive paths (such as bond wires, twisted pair wires, etc.) of any suitable length. In still further instances of the communication system 100 as described herein, a length of the communication link 127 disposed between the first communication circuit 171-1 and the second communication circuit 171-2 may be less than Y inches or any other suitable value, where Y is a value such as ¼, ½, ¾, 1, 2, 3, 4, 5, 6, 7, 8, 9, 10, etc. As previously discussed, the length of the communication link 127 may be greater than the value Y.

Note that the communication system 100 as discussed herein can be implemented in any suitable manner. For example, the communication circuit 171-1 can be implemented as a single-chip solution including one or more differential and bidirectional transceivers attached to a sub-sSiO2 dielectric isolation barrier between 2 metal layers, forming the capacitive channel. Placing one instance of this die (such as communication circuit 170-1) in the transmitter side of the communication system 100 and the other die (such as communication circuit 170-2) in the receiver side of the communication system 100 (rotated 180 degrees) and connecting them in series doubles the effective isolation, increasing a magnitude of a respective breakdown voltage.

Note that the single-chip including the communication circuit 171-1 can include any number of replica transceivers (such as communication circuit 171-11, 171-12, etc.; each being similar to communication circuit 171-1) on the first semiconductor chip. A second semiconductor chip can be configured to include the communication circuit 171-2 and can include any number of replica transceivers (such as communication circuit 171-21, 171-22, etc.; each being similar to communication circuit 171-2) on that same second semiconductor chip. Each of the communication links 127-2, 127-3, etc., is similar to communication link 127. The first semiconductor chip and the second semiconductor chip may be mounted on the same substrate in a manner as shown in FIG. 1. The first semiconductor chip in the second semiconductor chip may be cut from the same wafer.

Thus, all or a portion of the first communication circuit 171-1 may be configured as a first semiconductor chip. In such an instance, the active inductors 181-1 and 181-2 and corresponding one or more capacitors are disposed on the first semiconductor chip. The first semiconductor chip can be configured to include any number of transceivers and corresponding circuitry (such as similar to communication circuit 171-1).

Additionally, note that all or a portion of the communication circuit 171-2 may be configured as a second semiconductor chip. In such an instance, the active inductors 191-1 and 191-2 and corresponding one or more capacitors are disposed on a second semiconductor chip. The second semiconductor chip can be configured to include any number of transceivers and corresponding circuitry (such as similar to communication circuit 171-2). Thus, communication system 100 and corresponding communication link between each set of transceivers supports parallel and bidirectional conveyance of data.

As further discussed herein, settings of the inductances associated with active inductors as discussed herein can be achieved in any suitable manner. For example, the first active inductor 181-1 may be fabricated to provide a first inductance value via trimming of at least one component in the first active inductor. The second active inductor 191-1 may be fabricated to provide the second inductance value via trimming of at least one component in the second active inductor. Any of the pairs of active inductors (such as 181-1 and 191-1, 181-2 and 191-2, 181-3 and 191-3, 181-4 and 191-4, etc.) can be trimmed in a similar manner to substantially match each other.

An example of signals associated with a data flow from the communication circuit 171-1 to the communication circuit 171-2 is shown in FIGS. 12A-12F.

Figure 2:
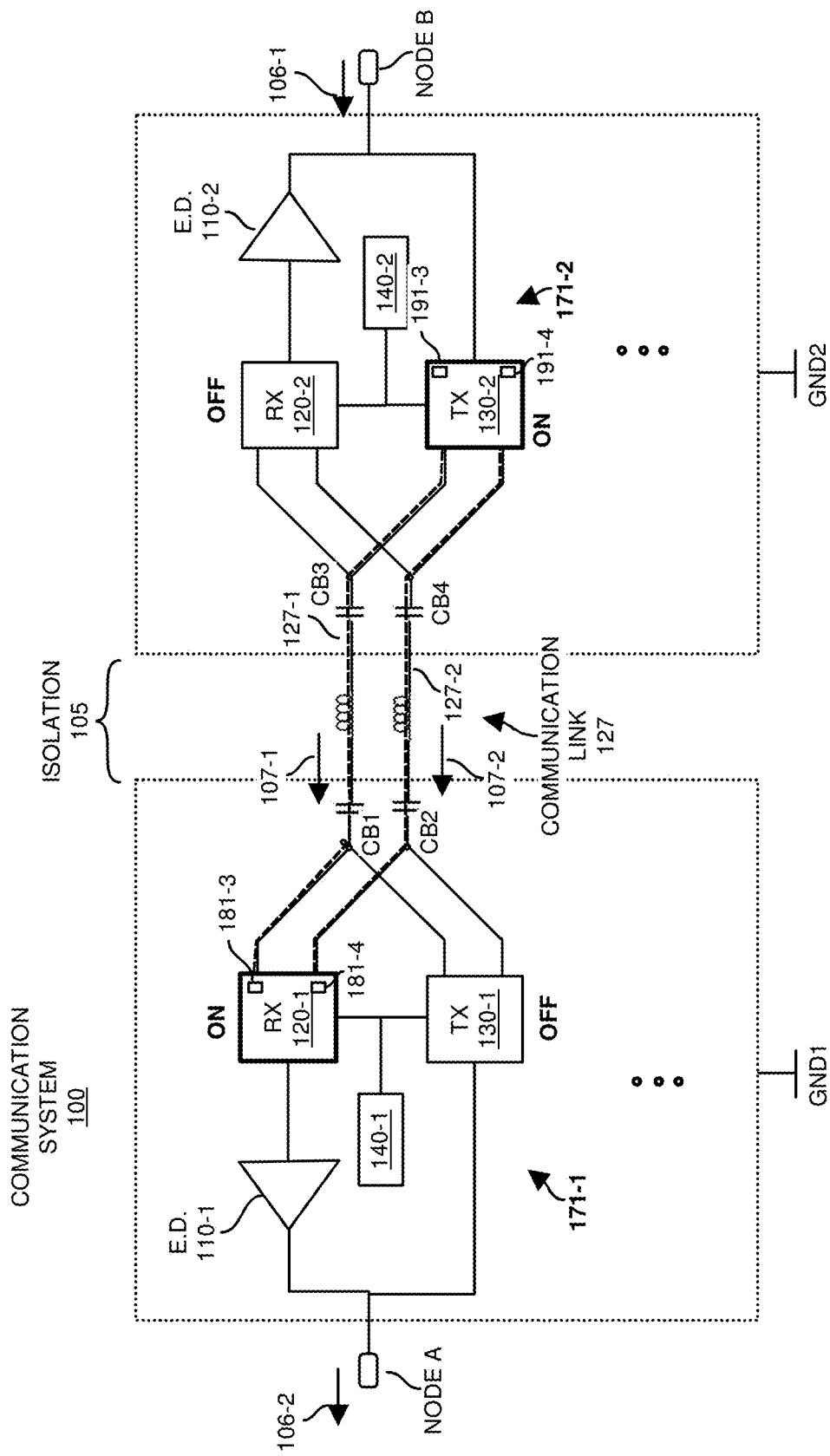
FIG. 2 is an example general diagram of a communication system and corresponding transmitter receiver pairs operating in second data flow mode as disclosed herein.

FIG. 2 is an example general diagram of a communication system and corresponding transmitter receiver pair operating in second data flow mode as disclosed herein.

In FIG. 2, the controller 140-2 controls the transmitter 130-2 and corresponding circuitry to be in an ON-state while it controls the receiver 120-2 and corresponding circuitry to be in an OFF-state. This causes the communication circuit 171-2 to be set to a transmitter mode of communicating data to the communication circuit 171-1.

Further in FIG. 2, the controller 140-1 controls the transmitter 130-1 and corresponding circuitry to be in an OFF-state while it controls the receiver 120-1 and corresponding circuitry to be in an ON-state. This causes the communication circuit 171-1 to be set to a receiver mode of receiving data from the communication circuit 171-2.

More specifically, during operation in an upstream mode (FIG. 2) from the communication circuit 171-2 to the communication circuit 171-1, the communication circuit 171-2 receives signal 106-1 at node B. Via the active inductor 191-3 and other circuitry, the transmitter 130-2 converts the received input signal 106-1 into signal 107-1 communicated over the communication path 127-1 to the receiver 120-1. As previously discussed, communication path 127-1 includes series disposed DC blocking capacitor CB1 and DC blocking capacitor CB3. As their name suggests, these blocking capacitors allow the AC component of the signal 107-1 transmitted by the transmitter 130-2 to pass along the communication path 127-1 to the receiver 120-1. As further illustrated, the communication path 127-1 may include some amount of parasitic inductance.

In general, the active inductor 191-3 controls a respective resonant frequency (or carrier frequency) of a modulation signal derived from the input signal 106-1; such a signal is communicated as signal 107-1 over the communication path 127-1. The receiver 120-1 includes a respective bandpass filter through which the received signal 107-1 passes to the envelope detector 110-1. The inductance of the active inductor 181-3 controls respective settings of the bandpass filter in the receiver 120-1. In one implementation, it is desired that the carrier frequency of the signal 107-1 as controlled by the inductance setting of the active inductor 191-3 substantially matches a peak bandpass carrier frequency setting associated with the receiver 120-1 and corresponding bandpass filter provide the best gain of the received signal 107-1. In one implementation, this disclosure includes substantially matching an inductance of the active inductor 191-3 to the inductance of the active inductor 181-3. An example is shown in FIG. 3 and following FIGS.

Referring again to FIG. 1, during operation in an upstream mode (FIG. 2) from the communication circuit 171-2 to the communication circuit 171-1, the communication circuit 171-2 receives signal 106-1 at node B. Via the active inductor 191-4 and other circuitry, the transmitter 130-2 converts the received input signal 106-1 into signal 107-2 communicated over the communication path 127-2 to the receiver 120-1. As previously discussed, communication path 127-2 includes series disposed DC blocking capacitor CB2 and DC blocking capacitor CB4. As their name suggests, these blocking capacitors allow the AC component of the signal 107-2 transmitted by the transmitter 130-2 to pass along the communication path 127-2 to the receiver 120-1. As further illustrated, the communication path 127-2 may include some amount of parasitic inductance.

Figure 3:
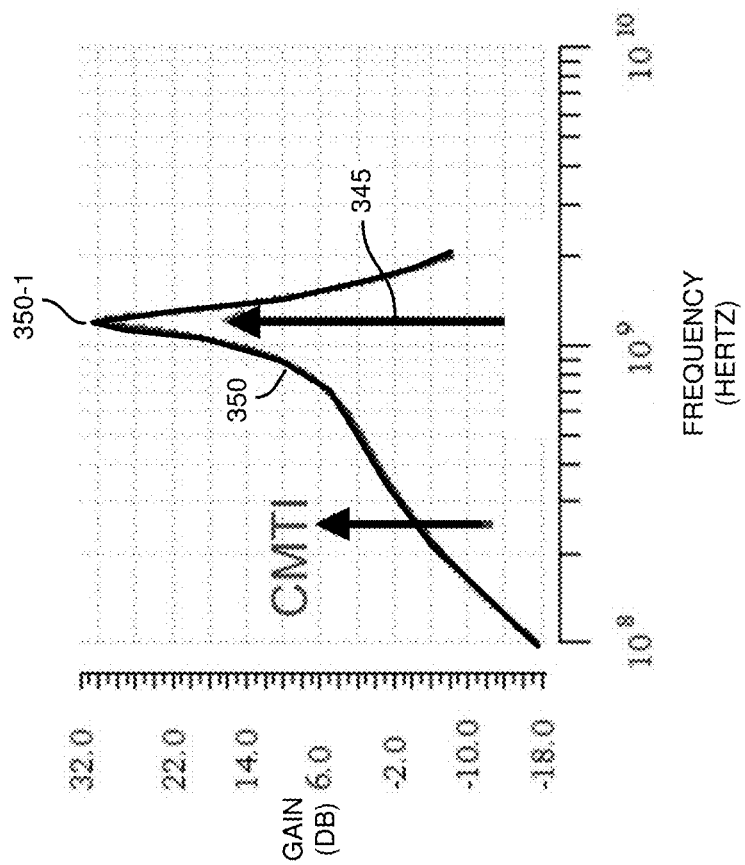
FIG. 3 is an example diagram illustrating a transmitter carrier frequency and receiver band pass filter gain (bandpass filter response) as disclosed herein.

FIG. 3 is an example diagram illustrating a transmitter carrier frequency and receiver band pass filter gain as disclosed herein.

One solution to provide robust communications between the communication circuitry includes implementation of one or more active inductors to implement a high-order bandpass filter in the receiver 120-2, and implementation of one or more active inductors in the transmitter 130-1.

Via implementation of a substantially similar active-LC structure (such including one or more active inductors) on both the transmitter and receiver, the same resonant frequency behavior over process and temperature is achieved on both sides of the communication system 100. This active inductor matching and/or alignment of a resonant frequency 345 of the transmitted signal 105-1 to the resonant frequency or peak frequency 350-1 of the band-pass filter response 350 in the receiver maximizes the signal to noise/interference ratio at the output of the band-pass filter in the receiver, which increases robustness and response such that there is no need for blanking time blocks and its associated extra propagation delay time.

Figure 4:
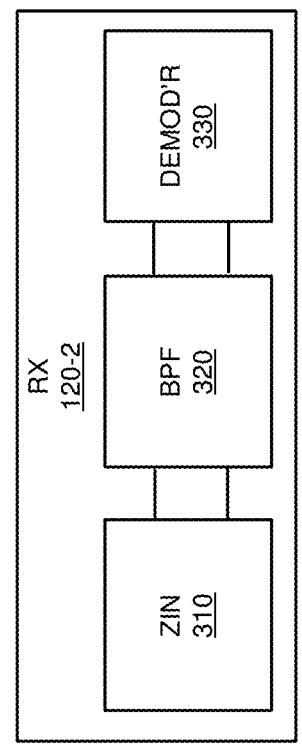
FIG. 4 is an example diagram illustrating components in a receiver as discussed herein.

FIG. 4 is an example diagram illustrating the receiver as discussed herein.

In this instance, the receiver 120-2 associated with the communication circuit 171-2 include multiple components such as input impedance 310, bandpass filter 320, and the demodulator 330. Each receiver in the communication system 100 is implemented in a similar manner.

Figure 5:
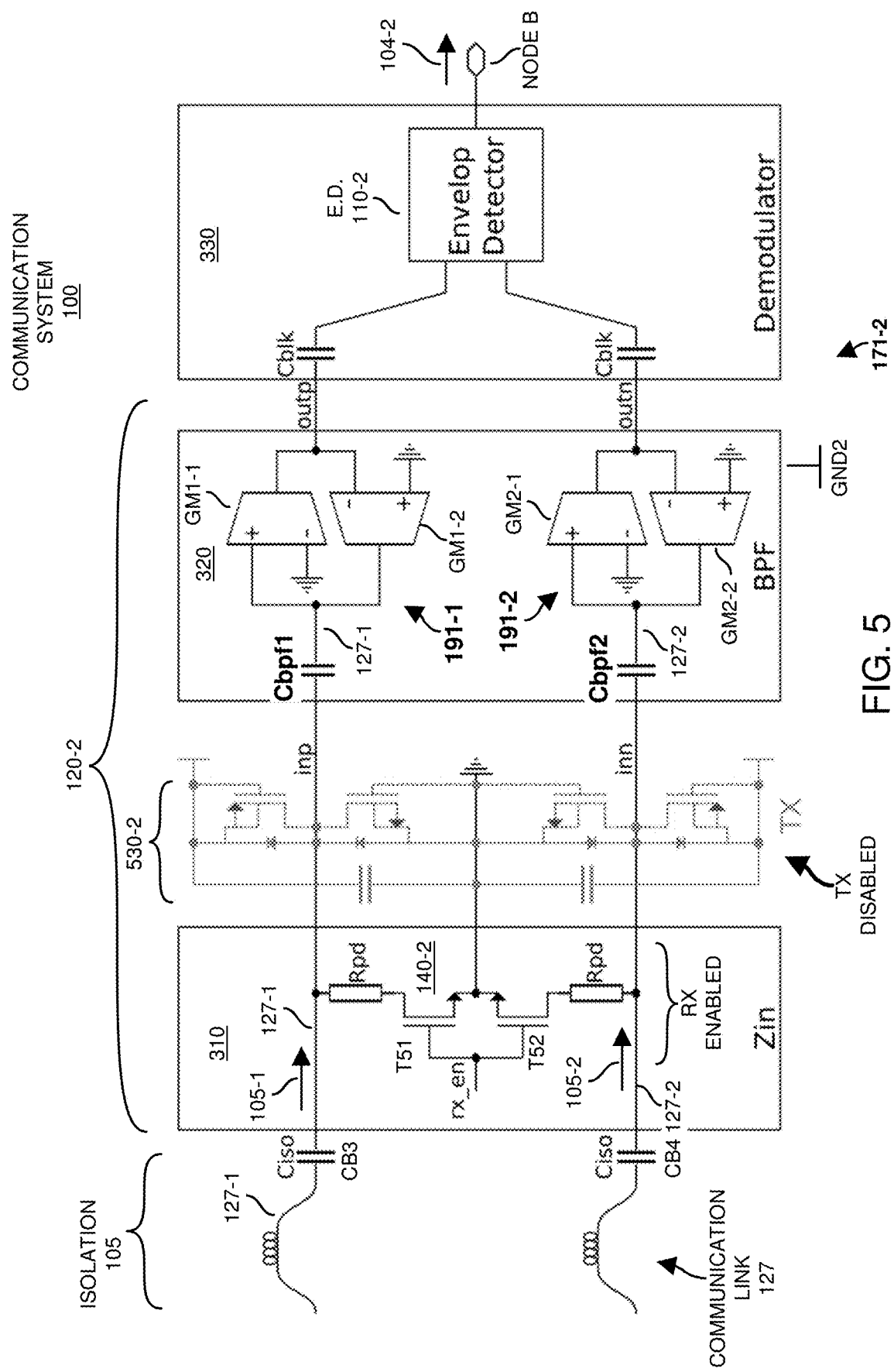
FIG. 5 is an example diagram illustrating details of a receiver circuit as disclosed herein.

FIG. 5 is an example diagram illustrating a receiver circuit as disclosed herein.

As previously discussed, the controller 140-2 and corresponding circuitry including transistor T51 and transistor T52 controls the operation of the receiver 120-2 in the receiver mode. The controller 140-2 deactivates the corresponding transistor circuitry 530-2.

As shown, the active inductor 191-1 and band-pass filter is implemented via a combination of transconductance amplifier GM1-1 and transconductance amplifier GM1-2 as well as capacitor Cbpf1. As previously discussed, the active inductor 191-1 is disposed in a respective band pass filter 320 associated with circuit path 127-1. Capacitor Cbpf1 is associated with band-pass filter 320. As its name suggests, the capacitor Cblk is a DC blocking capacitor. The inductance of the act of inductor 191-1 and the bandpass capacitor Cbpf1 controls a setting of the frequencies associated with the bandpass filter response 350 and, more specifically, which frequencies associated with the received signal 105-1 (set to resonant frequency 345 by the transmitter) are passed through to the envelope detector 110-2.

Similarly, the active inductor 191-2 and band-pass filter is implemented via a combination of transconductance amplifier GM2-1 and transconductance amplifier GM2-2 as well as capacitor Cbpf2. As previously discussed, the active inductor 191-2 is disposed in a respective band pass filter 320 associated with circuit path 127-2. Capacitor Cbpf2 is associated with band-pass filter 320. As its name suggests, the capacitor Cblk is a DC blocking capacitor. The inductance of the active inductor 191-2 and the bandpass capacitor Cbpf2 controls a setting of the frequencies associated with the bandpass filter response 350 and, more specifically, which frequencies associated with the received signal 105-2 (set to resonant frequency 345 by the transmitter) are passed through to the envelope detector 110-2. As previously discussed, the inductance of the active inductor 181-2 in the transmitter 130-1 defines a resonant frequency of a resonant circuit path coupled to the communication link 127-2. Further, the inductance of the active inductor 191-2 defines a bandpass filter response 350 of bandpass filter 320 coupled to the communication link 127-2 in the communication circuit 171-2.

Figure 6:
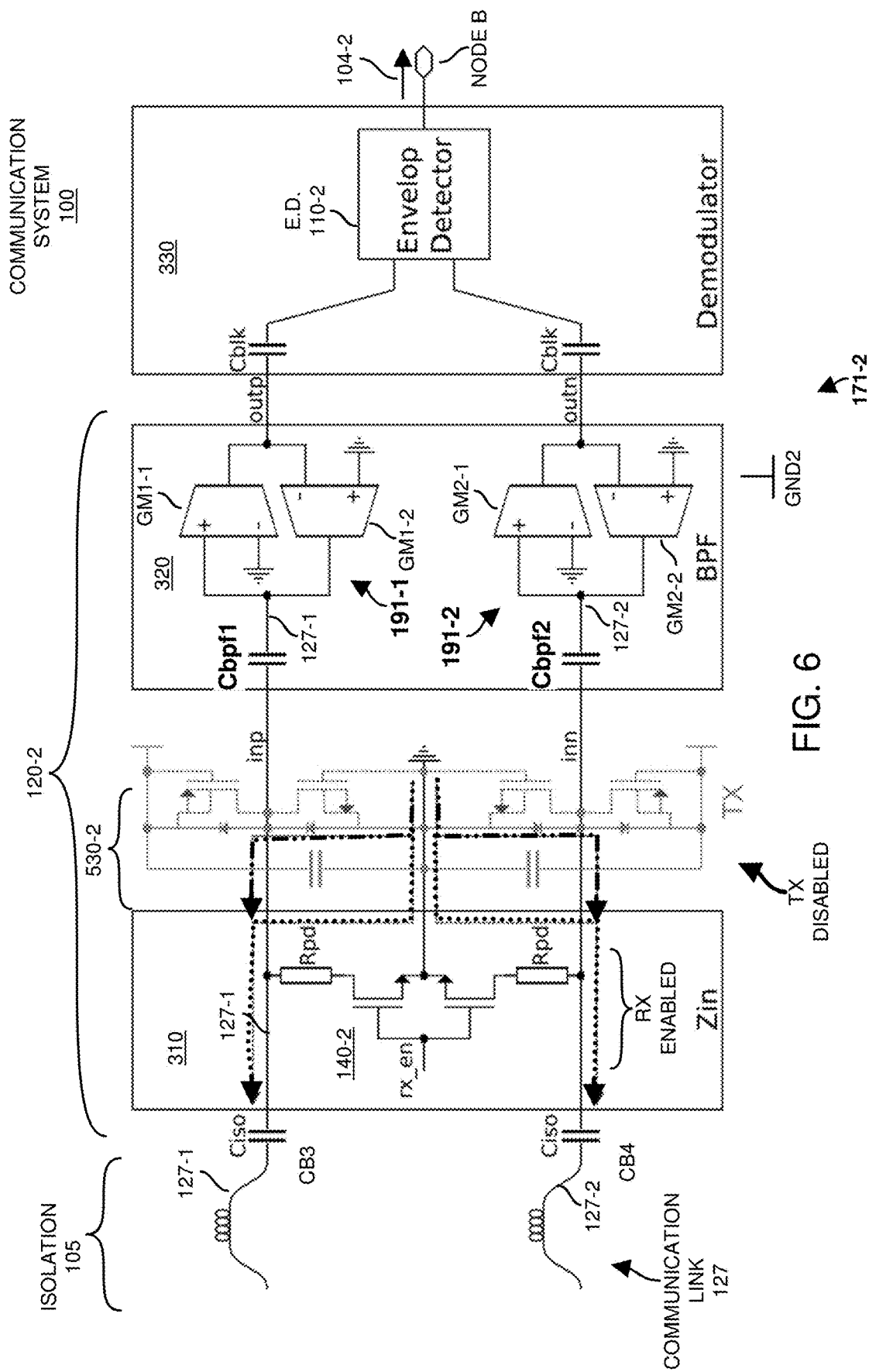
FIG. 6 is an example diagram illustrating a displacement current dominant paths during a rising edge of a receiver ground with respect to a transmitter ground as disclosed herein.

FIG. 6 is an example diagram illustrating a displacement current dominant paths during the rising edge of a receiver ground of communication circuit 171-2 with respect to a transmitter ground of communication circuit 171-1 as disclosed herein.

Figure 7:
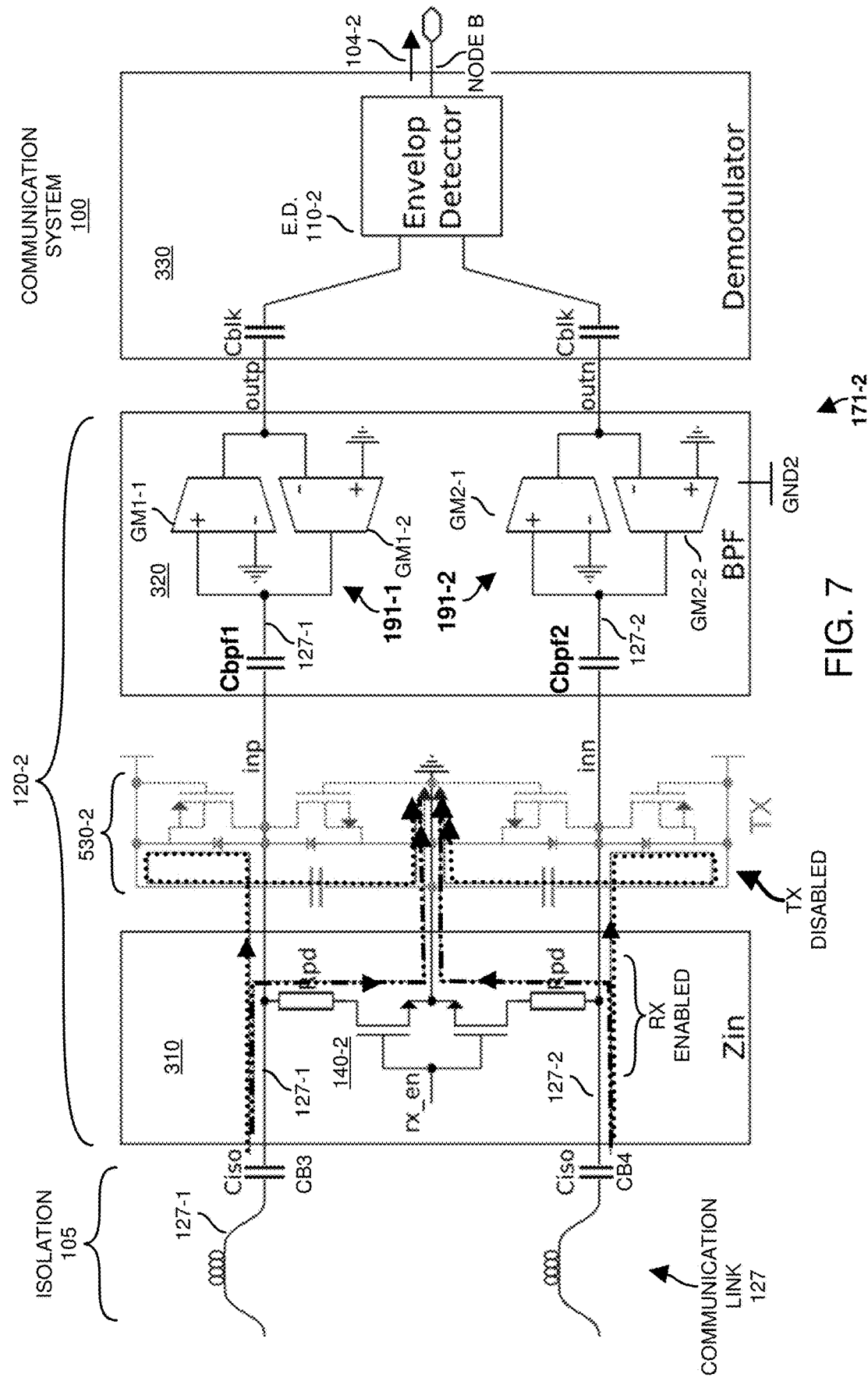
FIG. 7 is an example diagram illustrating displacement current dominant paths during a falling edge of a receiver ground with respect to a transmitter ground as disclosed herein.

It should be noted that the bi-directionality of the proposed solution of communication circuitry (of communication system 100) helps to contain/stir the CMT (Common Mode Transistor) displacement current under a well-defined path to improve CMT robustness. For example, FIG. 6 illustrates flow of currents from the receiver 120-2 through the differential communication link 127 when the ground reference voltage GND2 is substantially greater than the ground reference voltage GND1. FIG. 7 illustrates flow of currents from the transmitter 130-1 through the communication link 127 to the receiver 120-1 when the ground reference voltage GND1 is substantially greater than the ground reference voltage GND2.

Figure 8:
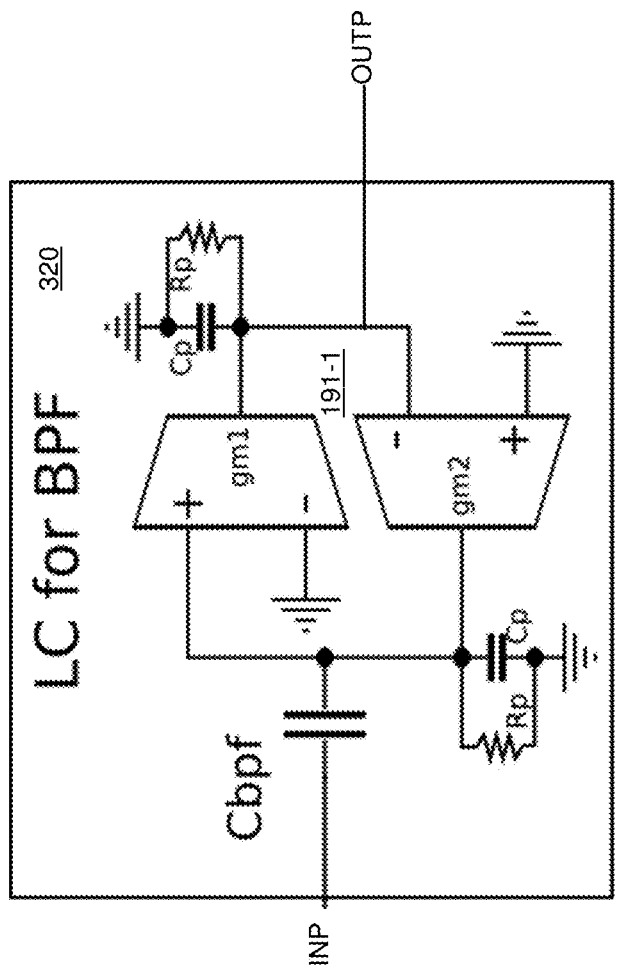
FIG. 8 is an example diagram illustrating an LC element in a bandpass filter as disclosed herein.

FIG. 8 is an example diagram illustrating an LC element used for creating a bandpass filter as disclosed herein.

As previously discussed, the communication system 100 is a capacitive coupling communication system implementing one or more active inductors to provide improved conveyance of data from a first communication circuit to a second communication circuit over a communication link.

In one implementation, the bandpass filter center frequency is basically defined by the LC element associated with the band-pass filter as depicted in FIG. 8. This structure has center or peak band-pass frequency defined by the equation 1.

$$\omega_o = \sqrt{\frac{gm1 \cdot gm2}{C_p \cdot (C_{bpf} + C_p)}} \quad (1)$$

Figure 9B:
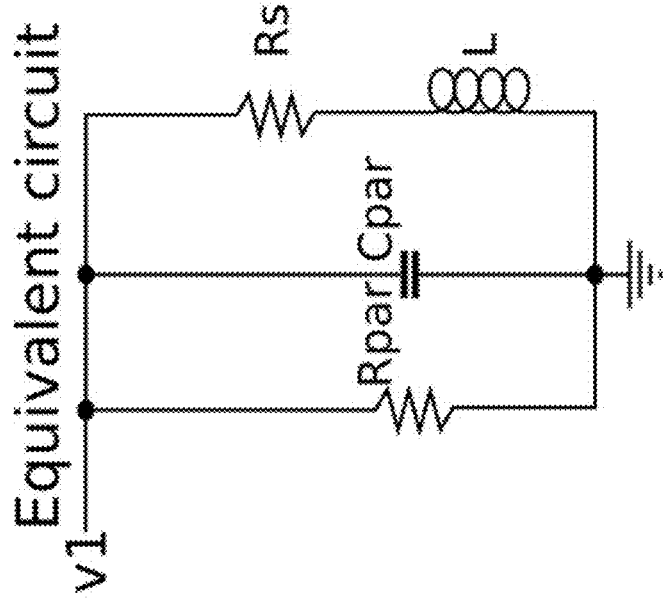
FIG. 9B is an example diagram illustrating an equivalent circuit of the active inductor of FIG. 9A as disclosed herein.
Figure 9A:
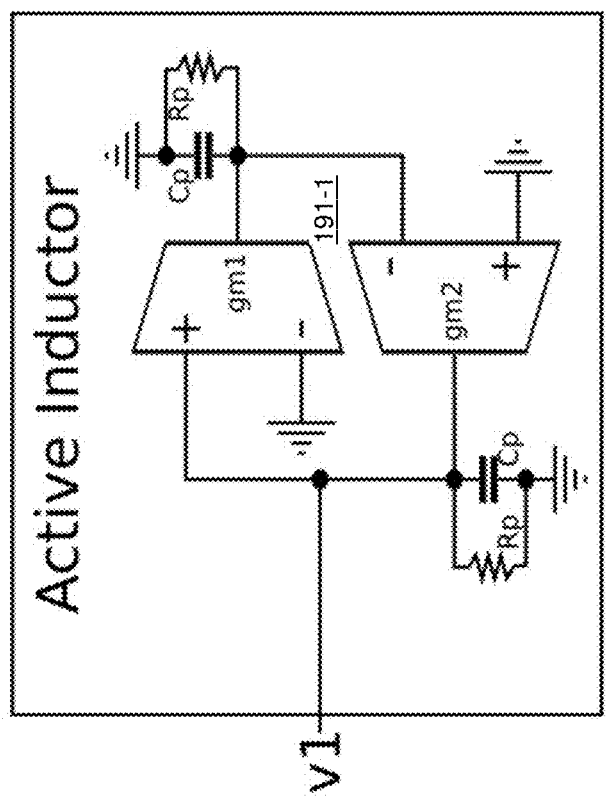
FIG. 9A is an example diagram illustrating an active inductor as disclosed herein.

FIG. 9A is an example diagram illustrating an active inductor as disclosed herein. Removal of the capacitor Cbpf from the bandpass filter results in the circuit as shown in FIG. 9A. The circuit in FIG. 9A maps to the equivalent circuit in FIG. 9B.

FIG. 9B is an example diagram illustrating an equivalent circuit of the active inductor of FIG. 9A as disclosed herein.

$$R_{par} = R_p \quad (2)$$

$$R_S = \frac{1}{gm1 \cdot gm2 \cdot R_p} \quad (3)$$

$$C_{par} = C_p \quad (4)$$

$$L = \frac{C_p}{gm1 \cdot gm2} \quad (5)$$

The resonant frequency of the equivalent circuit is defined by the square root of 1/LC, which in this case is defined by equation (6).

$$\omega_o = \sqrt{\left(\frac{gm1 \cdot gm2}{C_p}\right)\frac{1}{C_p}} \quad (6)$$

Figure 10:
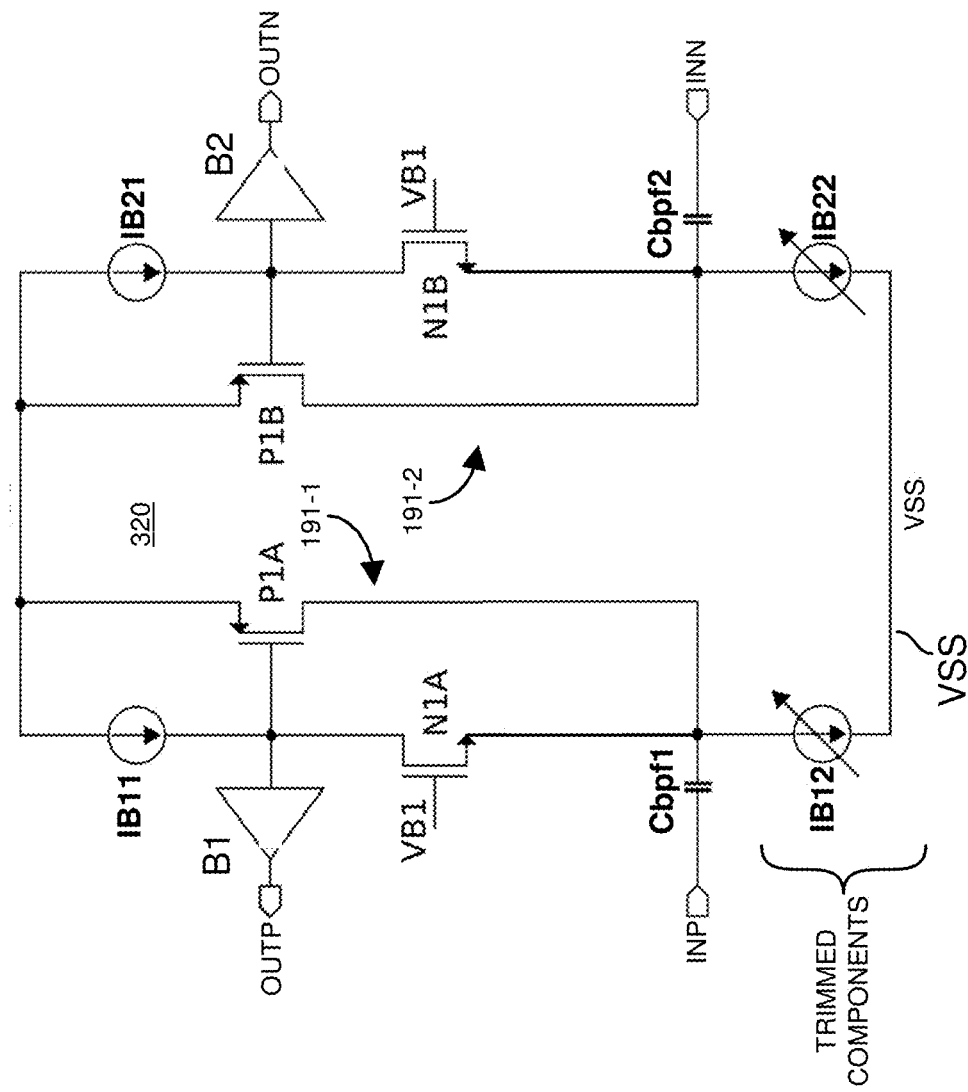
FIG. 10 is an example diagram illustrating a general architecture used for an active inductor implementation as disclosed herein.

The receiver architecture as discussed herein allows the increase of the filter order by cascading more filters in series with the first or by tuning the quality factor of the active inductor. The active inductor architecture is shown in FIG. 10 below, connected to the positive input (inp) it can be seen the respective Cbpf capacitor and the back-to-back transconductors, implemented by N1A (gm1 or GM1-1) and P1A (gm2 or GM1-2). The gyrator output is buffered by the buffer blocks, which can be implemented as a source follower for example. The whole structure is symmetrically repeated for the negative input (inn).

FIG. 10 is an example diagram illustrating a generator architecture used for an active inductor implementation as disclosed herein.

In this example embodiment, the implementation of the band-pass filter 320 includes capacitors Cbpf1 and Cbpf2, current source IB11, buffers B1 and B2, transistors P1A, P1B, N1A, N1B, and variable current sources IB21 and IB22. The variable current sources IB21 and IB22 can be trimmed to change the respective inductance associated with each of the active inductor implemented in the bandpass filter 320.

Figure 11:
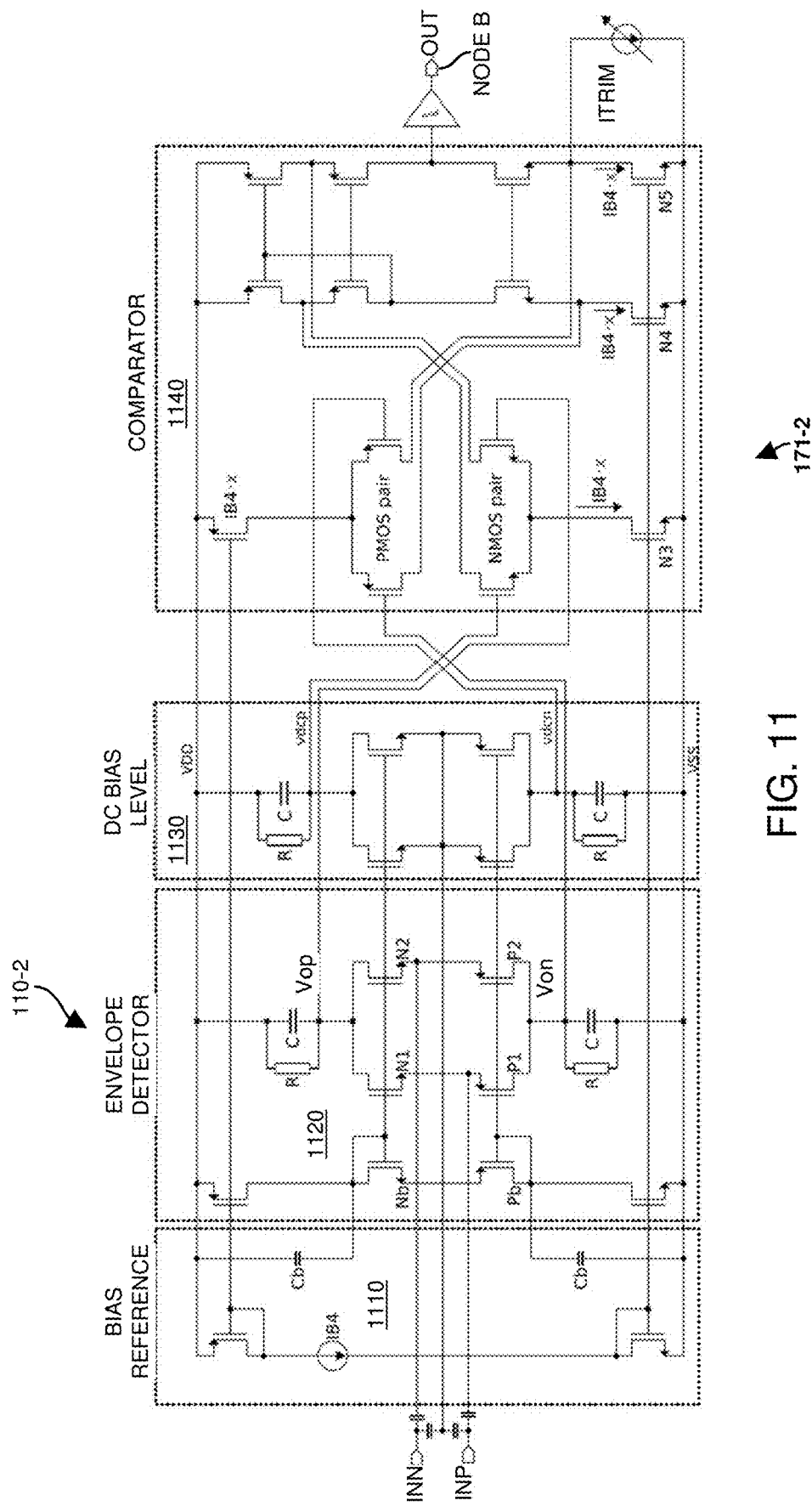
FIG. 11 is an example diagram illustrating a demodulator implementation as disclosed herein.

FIG. 11 is an example diagram illustrating a demodulator implementation as disclosed herein.

The differential output of the band-pass filter 320 is fed into the demodulator block, shown in FIG. 11, which consists of a bias reference 1110, envelop detector 1120 (also 110-2 in FIG. 1), DC bias level 1130, and comparator 1140.

In one implementation, the fully differential envelop detector 1120 is based on a low power topology where the input transistors operate in weak inversion to exploit the non-linear IxV transfer function characteristic of the NMOS and PMOS devices. Whenever a differential signal is applied into the INP and INN pins at time T1, the Vop voltage (envelope detect signal) drops, while the Von output voltage rises, as shown in FIGS. 12A-12F. The DC bias level sub-block 1130 is used to produce the same voltage level of Vop at the Vdcp node when no differential input signal is applied to the block input. Likewise, Vdcn has the same level as Von voltage (envelope detect signal) in no input condition.

The last sub-block of the demodulator 1140 is designed as a comparator 1140 using one NMOS and one PMOS differential pair connected to an active load, like in a rail-to-rail input amplifier. This allows the use of the full range of the differential signal produced by the previous sub-block at node Vop and Von. The comparator trip point (i.e., threshold level) can be defined by an extra current source Itrim connected to one of the output branches as depicted in FIG. 11.

FIGS. 12A, 12B, 12C, 12D, 12E, and 12F are an example timing diagrams of signals as disclosed herein.

Figure 12:
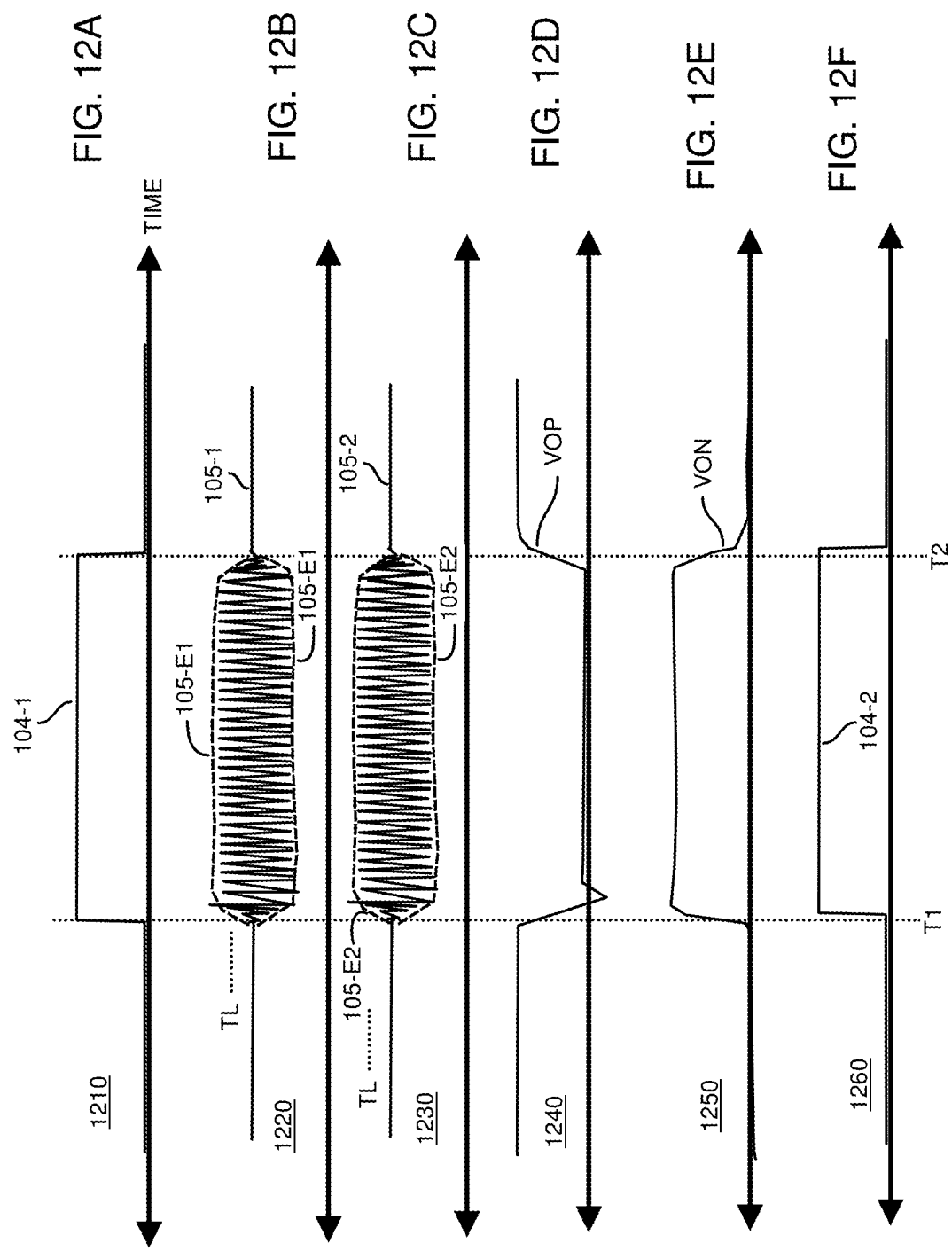
FIGS. 12A, 12B, 12C, 12D, 12E, and 12F are example timing diagrams of signals as disclosed herein.

For example, graph 1210 of FIG. 12A illustrates timing of input signal 104-1, which is logic high between time T1 and T2 and otherwise logic low.

Graph 1220 of FIG. 12B illustrates timing associated with transmitted signal 105-1 and operation at a resonant frequency between time T1 and T2 when signal 104-1 is a logic high. Note that the resonant frequency associated with the transmitter 130-1 and corresponding transmitted signal 105-1 is substantially greater than the frequency of signal 104-1. Via monitoring of the signal 105-1, the envelope detector 110-2 (1120) detects the envelope 105-E1.

Graph 1230 of FIG. 12C illustrates timing associated with signal 105-2 and operation at a resonant frequency between time T1 and T2 when signal 104-1 is a logic high. Note again that the resonant frequency associated with the transmitter 130-1 and corresponding transmitted signal 105-2 is substantially greater than the frequency of signal 104-1. Via monitoring of the signal 105-2, the envelope detector 110-2 (1120) detects the envelope 105-E2.

Graph 1240 a FIG. 12D illustrates the magnitude of voltage Vop over time. Logic low indicates detection of the envelope associated with signal 105-1 resonating at the resonant frequency of the transmitter 130-1.

Graph 1250 of FIG. 12E illustrates the magnitude of voltage Von over time. Logic high indicates detection of the envelope associated with signal 105-2 resonating at the resonant frequency of the transmitter 130-1.

Graph 1260 of FIG. 12F illustrates the generation and output of the corresponding signal 104-2 from the communication circuit 171-2. Thus, detection of the envelope 105-E1 between time T1 and T2 associated with the signal 105-1 and detection of the envelope 105-E2 associated with signal 105-2 between time T1 and T2 results in the envelope detector generating the output signal 104-2 from node B (whose magnitude is a logic high during conditions in which the envelopes are detected), which is a reproduction of the original signal 104-1.

Figure 13:
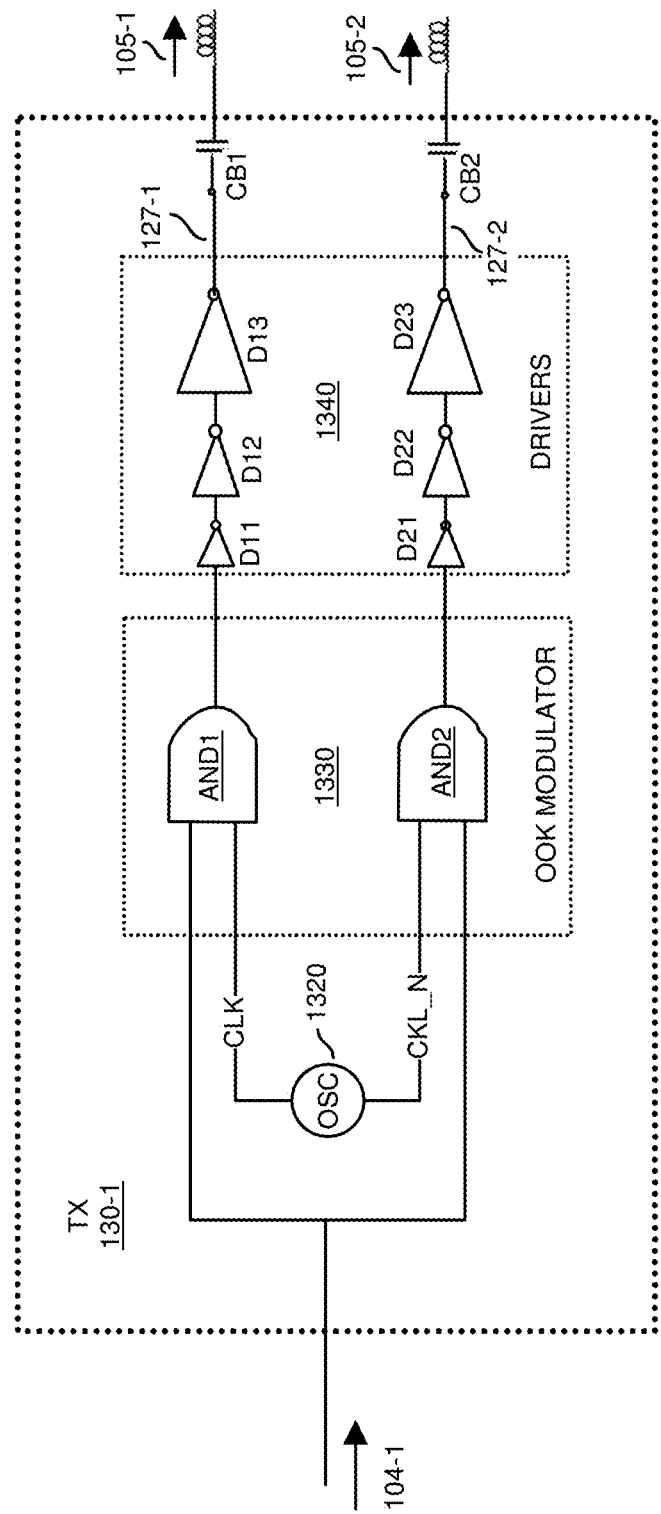
FIG. 13 is an example diagram illustrating components of a transmitter as disclosed herein.

FIG. 13 is an example diagram illustrating a transmitter circuit as disclosed herein.

Implementation of the transmitter 130-1 (and related components) includes oscillator 1320, modulator 1330 (including logic AND1 and logic AND2), and drivers 1340.

As shown, the transmitter 130-1 receives signal 104-1 in a manner as previously discussed. Signal 104-1 is inputted to the inputs of the logic AND1 and logic AND2. The output of logic AND1 drives the sequence of drivers D11, D12, D13. Driver D13 outputs the corresponding signal 105-1 to the communication path 127-1 including the capacitor CB1. The output of logic AND2 drives the sequence of drivers D21, D22, D23. Driver D23 outputs the corresponding signal 105-2 to the communication path 127-2 including the capacitor CB2.

Thus, according to one configuration, the On-OFF Keying modulator 1330 is performed by a simple logic AND combination of the input signal 104-1, received from the input pin (node A), with the oscillator 1320 output signal defined as CLK and CLK_N. The CLK_N signal is 180 degrees out of phase with respect to CLK signal.

Figure 14:
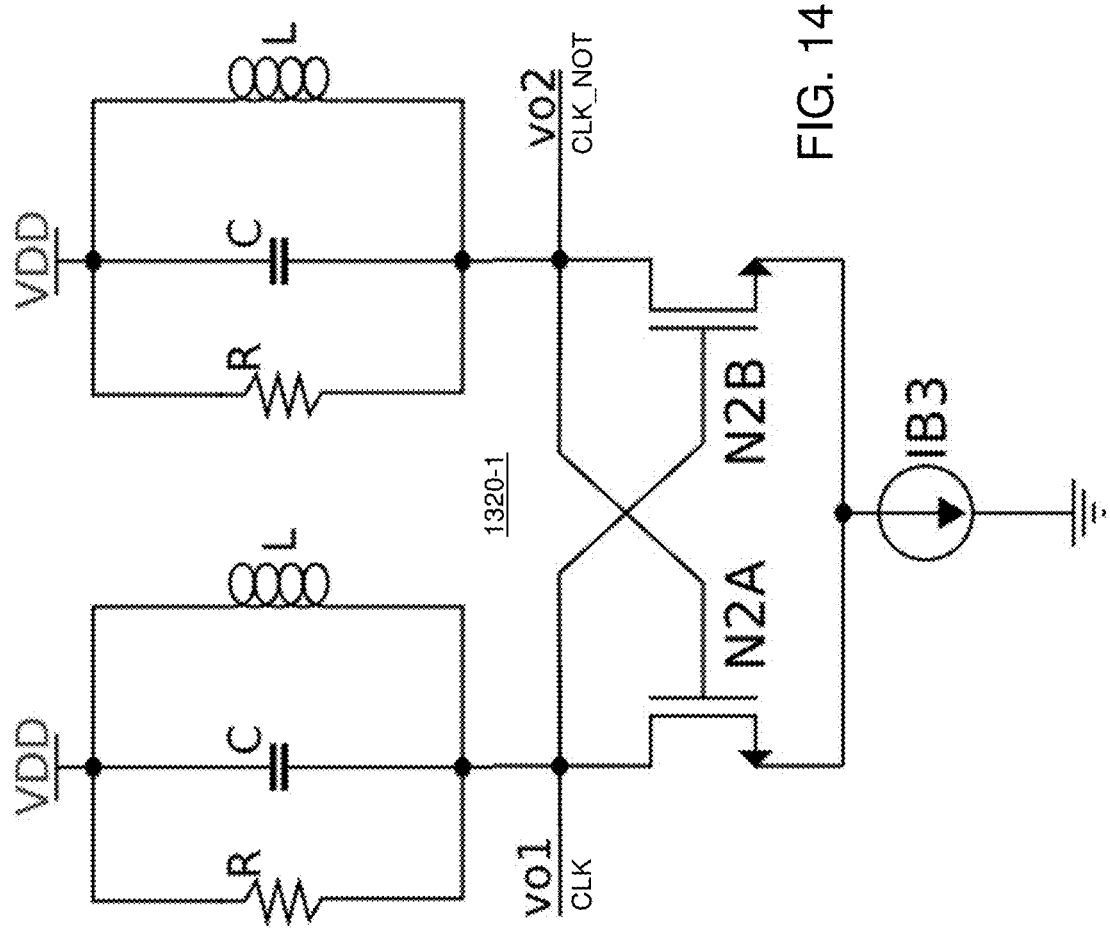
FIG. 14 is an example diagram illustrating an oscillator implementation as disclosed herein.

FIG. 14 is an example diagram illustrating an oscillator implementation as disclosed herein.

Among several ways to implement oscillator 1320, one way is to implement a harmonic LC oscillator 1320-1 since it allows the use of the same active inductor structure to build the LC part of the LC oscillator. One example of oscillator 1320 is shown in FIG. 14, where the lossy part of the LC structure is represented by the parallel resistor R which can be compensated if a continuous oscillatory behavior is desired. This is where the cross-coupled transistors N2A and N2B are implemented to create a negative resistance, opposing the losses in the active inductor.

Figure 15:
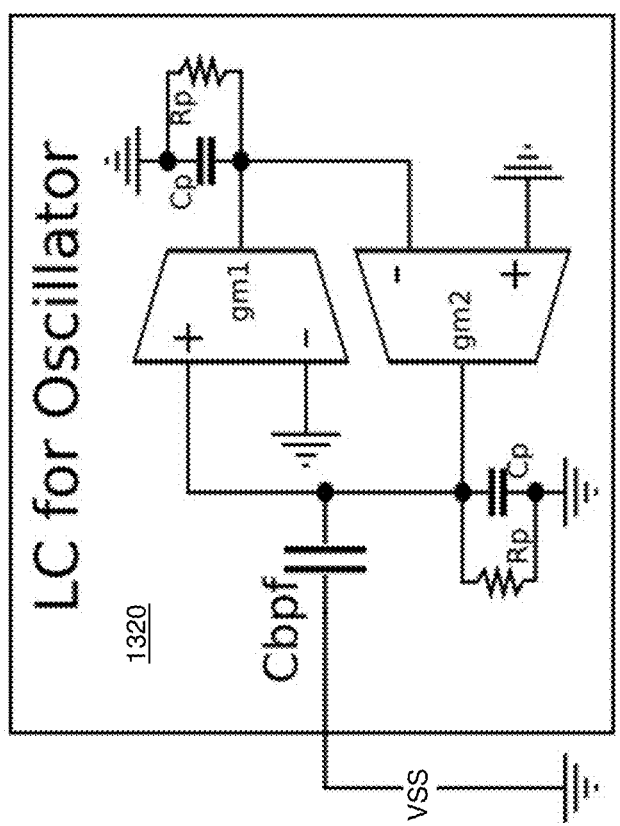
FIG. 15 is an example diagram illustrating an LC element associated with an oscillator as disclosed herein.

FIG. 15 is an example diagram illustrating an LC element used to create an oscillator as disclosed herein.

In one embodiment, the RLC part of the oscillator 1320 shown in FIG. 14 is selected to be identical to the active inductor structure (active inductor 191-1) of the bandpass filter 320 of the communication circuit 171-2, with a single modification on the v1 input terminal connection, which is instead connected to VSS (GND1). The similarities are more clear when one compares the circuit in FIG. 15 to the circuit in FIG. 8.

The resonant frequency of the structure in FIG. 15 is also given by equation (1) as follows:

$$\omega_o = \sqrt{\frac{gm1 \cdot gm2}{C_p \cdot (C_{bpf} + C_p)}} \quad (1)$$

which make the matching between the carrier frequency and the bandpass filter center frequency as high as possible. Thus, embodiments herein can include substantially matching an inductance of the active inductor 181-1 in the transmitter 130-1 to the active inductor 191-1 in the receiver 120-2. Matching of the transistor-level implementation of this oscillator 1320 is further shown in FIG. 16, which can be compared to FIG. 10 of the bandpass filter 320, which shows the matching of the active inductor 181-1 associated with the transmitter 130-1 to the active inductor 191-1 in the receiver 120-2 on the opposite side of the transmission channel (communication link 127).

Figure 16:
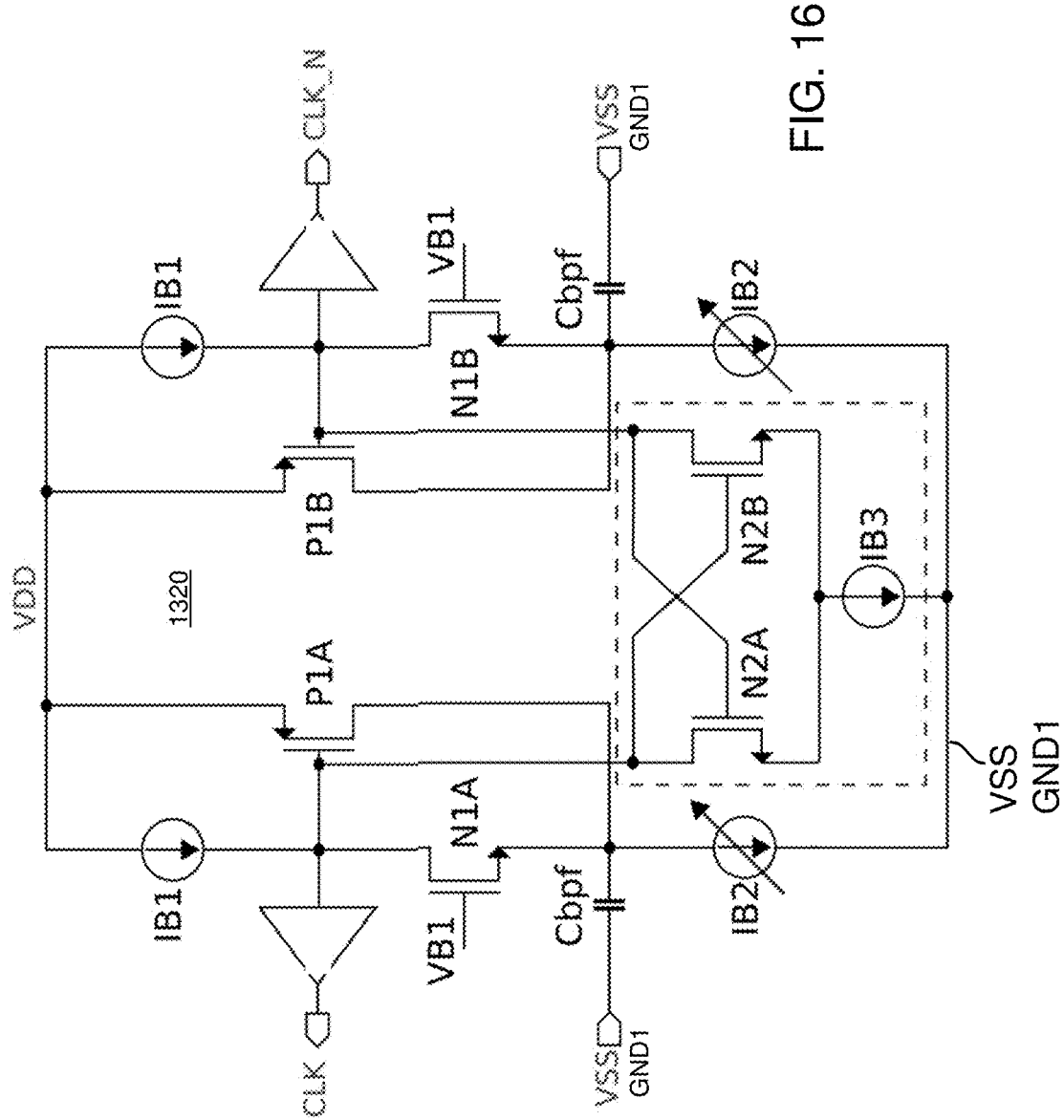
FIG. 16 is an example diagram illustrating an oscillator as disclosed herein.

FIG. 16 is an example diagram illustrating an oscillator as disclosed herein.

As previously discussed, the modulator block 1330 is responsible for mixing up (modulating) the input signal 104-1 with the oscillator 1320 (such as depicted in FIG. 16) output via the AND1 and AND2 gates. The last stage (i.e., sequence of drivers D11, D12, D13 as well as sequence of drivers D21, D22, D23) completes the transmitter architecture (transmitter 130-1). The drivers 1340 can be configured as an inverter chain with a fixed ratio between the stages used to properly drive the capacitive load of the isolation channel, as shown in FIG. 13.

Figure 17:
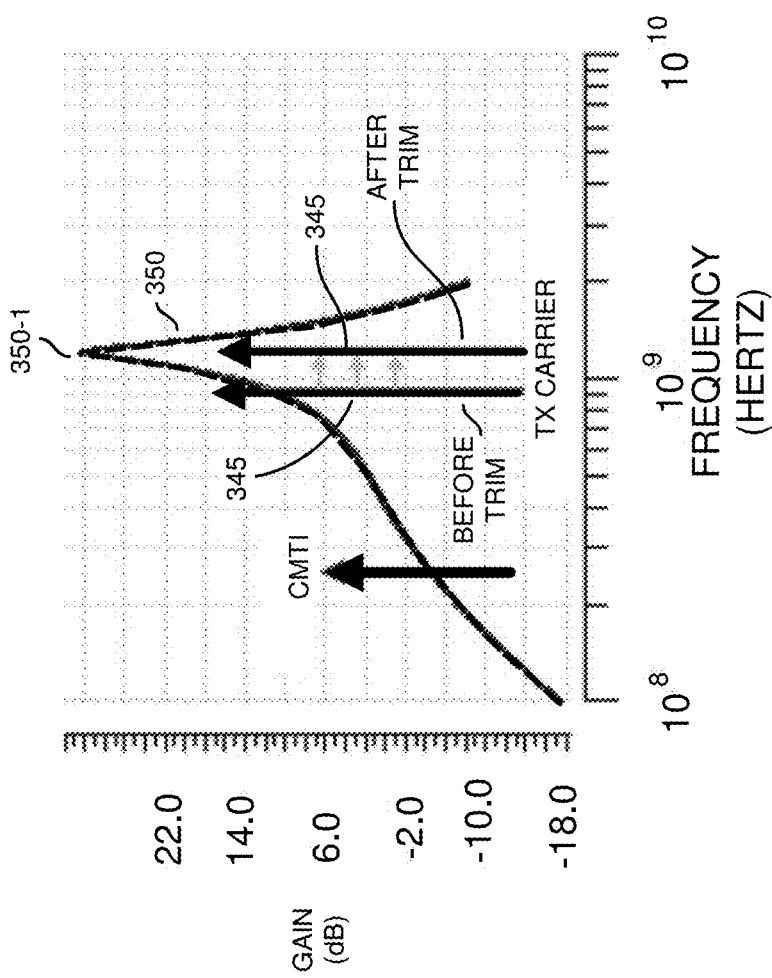
FIG. 17 is an example diagram illustrating trimming of a transmitter carrier frequency as disclosed herein.

FIG. 17 is an example diagram illustrating trimming of a transmitter carrier frequency (resonant frequency) as disclosed herein.

In one implementation, the inductance associated with the active inductor 181-1 (i.e., any transmitter active inductor) is adjusted such that, after trimming, the resonant frequency (carrier frequency 345) of transmitting the signal 105-1 aligns with the peak frequency 350-1 associated with the bandpass filter response 350.

Thus, from the testing point of view, this implementation allows transmitter/receiver fine tuning at ATE (Automated Test Equipment) by measuring propagation delay ON/OFF in a two-step process. When there is a mismatch between transmitter's carrier and receiver's bandpass filter resonant frequency, the amplitude of the signal passed on to the demodulator block will be smaller than expected. Trimming of a respective active inductor 181-1 (in a transmitter) to align the carrier frequency 345 to the peak frequency 350-1 ensures that the corresponding envelope detector receives a strong, noise free signal.

Figure 18:
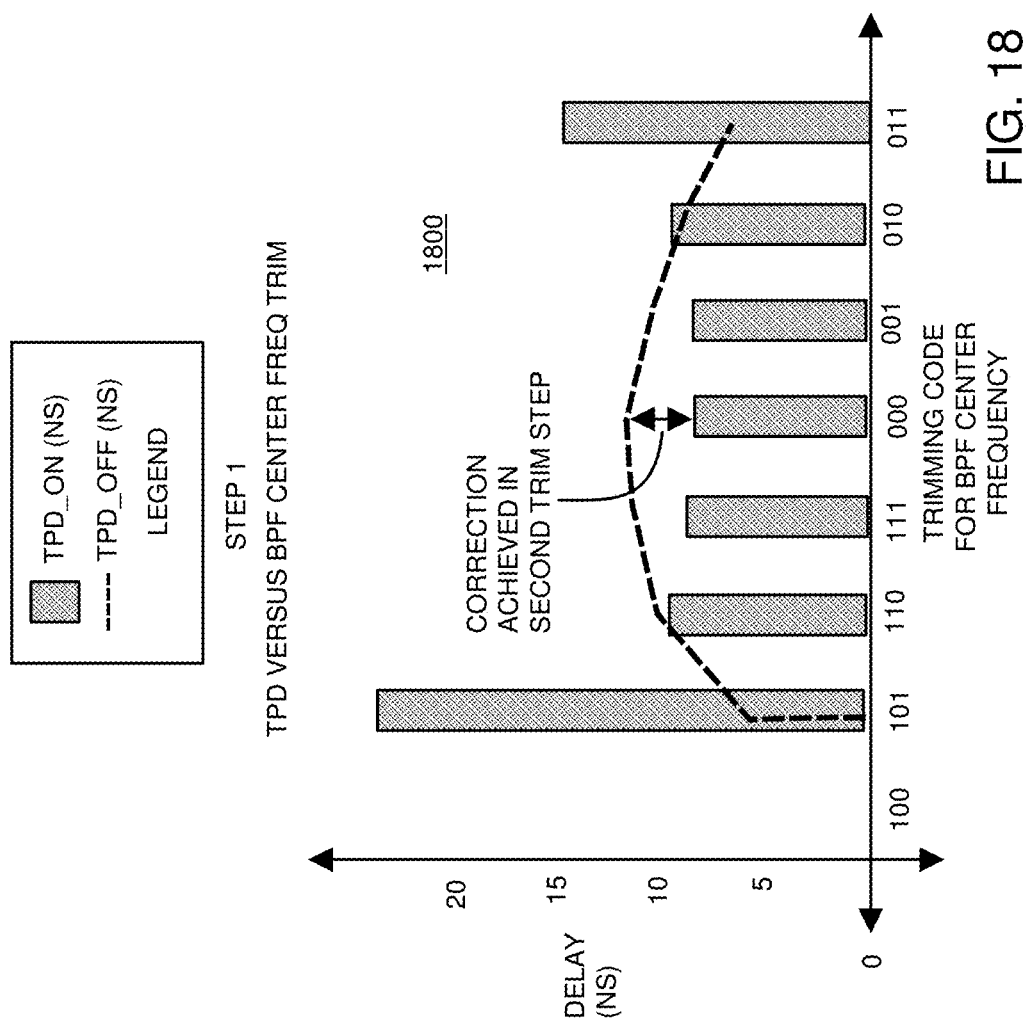
FIG. 18 is an example diagram illustrating a first step of trimming of the transmitter carrier and receiver bandpass resonance frequency as disclosed herein.

FIG. 18 is an example diagram illustrating trimming of the transmitter carrier and receiver bandpass resonance frequency as disclosed herein.

As previously discussed in FIG. 10, an implementation of the receiver 120-2 includes a band-pass filter 320 and active inductors 191-1 and 191-2. The current sources IB12 and IB22 associated with active inductors are trimmable to control band-pass filter settings of the band-pass filter 320. For example, in one implementation, the fabricator of the communication system 100 sets trimming bits (or trimming code on x-axis) in graph 1800 in a 1st trimming step to control each of the magnitudes of the respective current sources IB12 and IB22 such that the active inductors and corresponding band-pass filter 320 is set to the appropriate band-pass filter settings.

When the envelope threshold level at the demodulator (comparator 114) is kept constant, the abovementioned attenuated signal on the demodulator input will be translated in a longer propagation delay. Hence, a perfect match between the carrier frequency of the transmitted signal 105-1 and signal 1-502 and band-pass resonant frequency is achieved at the minimum ON propagation delay, as shown in FIG. 18.

Note the shift of the carrier frequency (such as by adjusting trim settings of current sources IB12 and IB22) associated with the transmitted signal 105 in FIG. 17 towards the band-pass resonant frequency (e.g. center frequency of band-pass filter 320) is shown by way of a non-limiting example; the trimming process could be carried out the other way around such as by shifting the band-pass filter center frequency such that the peak 350-1 (such as center frequency) of the band-pass filter substantially aligns with the resonant frequency (carrier frequency) of the transmitter 130-1 and corresponding signals 105. Thus, shifting the band-pass resonant frequency toward the carrier frequency will produce the same effect of desired tuning as shown in FIG. 19.

Figure 19:
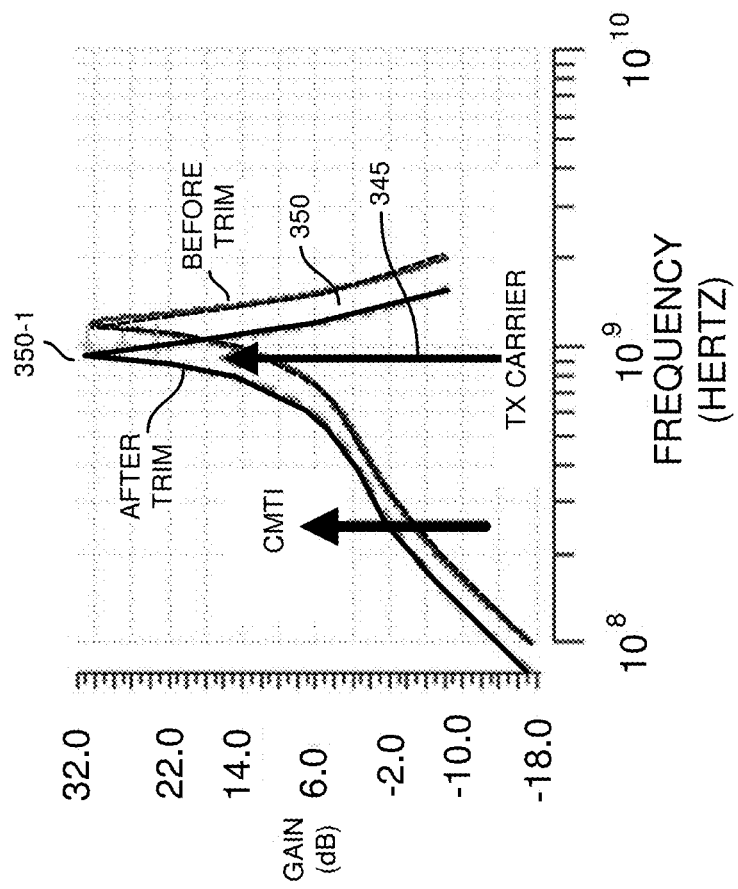
FIG. 19 is an example diagram illustrating trimming by shifting a bandpass filter resonance frequency as disclosed herein.

FIG. 19 is an example diagram illustrating trimming by shifting a bandpass filter resonance frequency as disclosed herein.

In one implementation, as previously discussed, the inductance associated with the active inductor 191-1 (such as band-pass filter active inductor) and corresponding band-pass filter 320 is adjusted (via trimming of the respective active inductor 191-1) to shift the band-pass filter response 350 and corresponding resonant band-pass filter frequency (or center frequency of band-pass filter) such that the band-pass filter resonant frequency and corresponding peak 350-1 of receiving the signal 105-1 substantially aligns with the carrier frequency 345 (resonant frequency) of received signal 105-1.

When there is a mismatch between transmitter's carrier and receiver's bandpass filter resonant frequency, the amplitude of the signal passed on to the demodulator block will be smaller than expected. Trimming of the active inductor 191-1 to align the peak frequency 350-1 of the bandpass filter resonant frequency to the carrier frequency 345 of the corresponding transmitter and transmitted signal ensures that the envelope detector receives a strong as possible signal.

Figure 20:
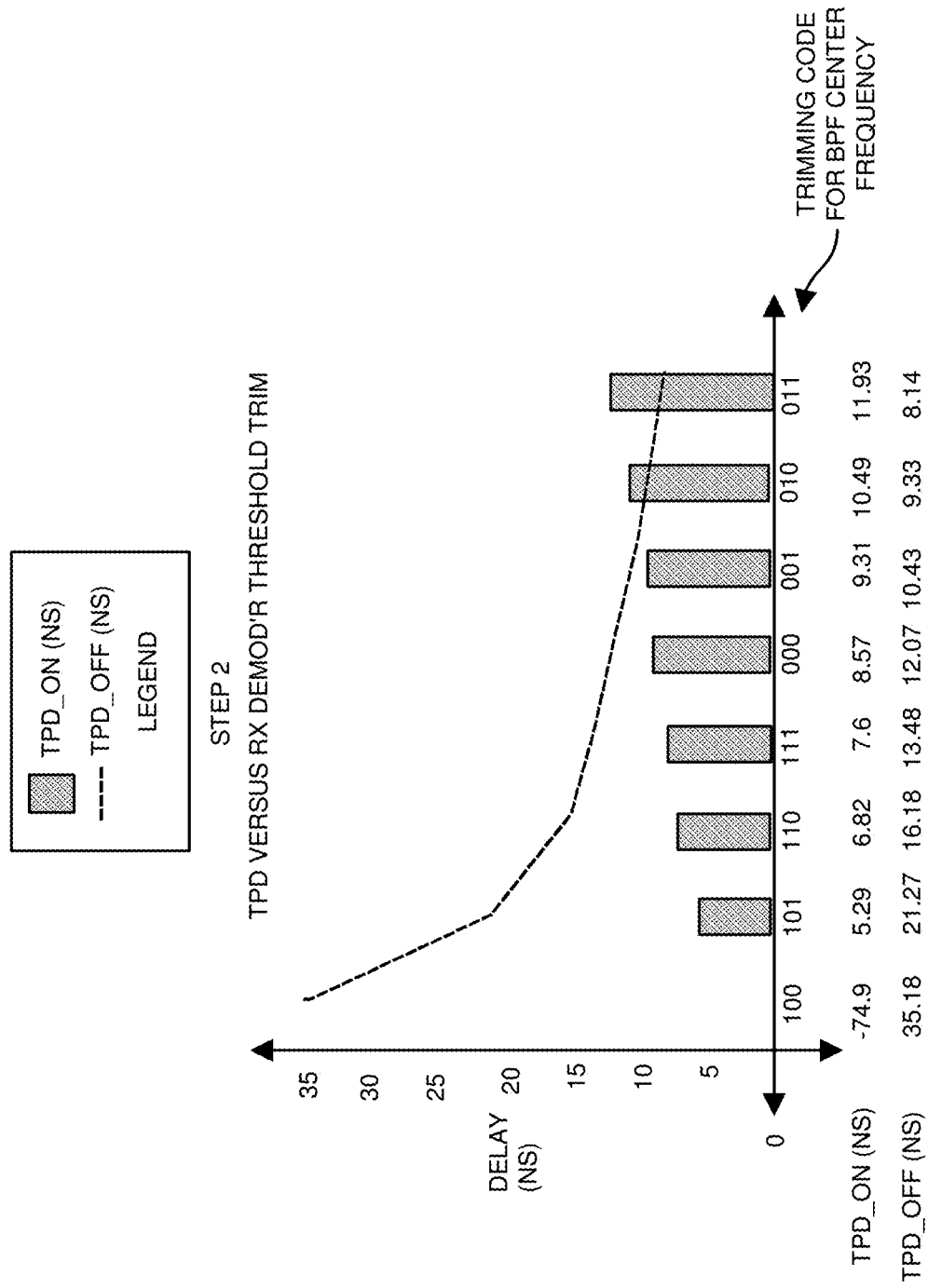
FIG. 20 is an example diagram illustrating a second step of trimming as disclosed herein.

FIG. 20 is an example diagram illustrating a second step of trimming of the transmitter carrier and receiver bandpass resonance frequency as disclosed herein.

As shown in FIG. 20, the threshold level (TL) of the envelope detector can be trimmed via varying the magnitude of the current source Itrim in FIG. 11. The magnitude of the current associated with Itrim is set via trim bit settings and is used to balance the propagation delay ON and OFF as depicted in FIG. 20.

Figure 21:
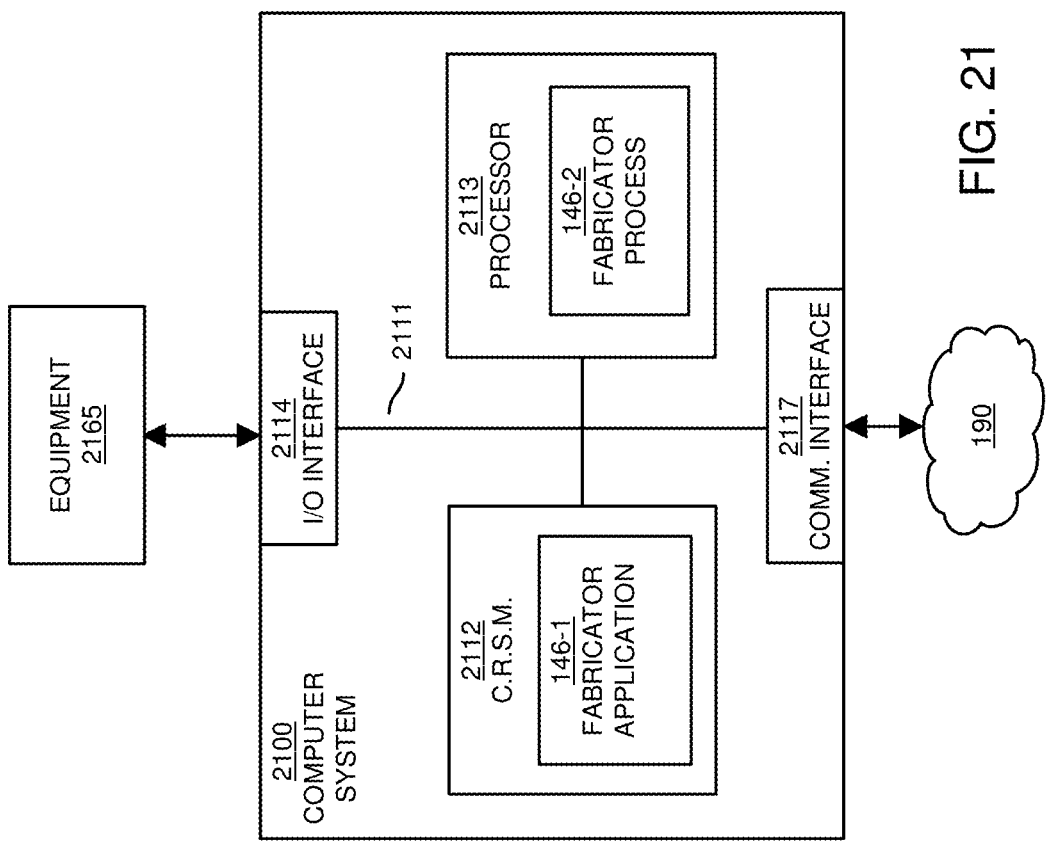
FIG. 21 is an example diagram illustrating computer processor hardware and related software instructions that execute methods as described herein.

FIG. 21 is an example block diagram of a computer device for implementing any of the operations as discussed herein.

As shown, computer system 2100 (such as implemented by any of one or more resources such as fabricator 146, etc.) of the present example includes an interconnect 2111 that couples computer readable storage media 2112 such as a non-transitory type of media (or hardware storage media) in which digital information can be stored and retrieved, a processor 2113 (e.g., computer processor hardware such as one or more processor devices), I/O interface 2114, and a communications interface 2117.

Computer system 2100 such as associated with the fabricator 146 controls equipment 2165 to execute any operations associated with fabrication of the communication system 100 as discussed herein.

I/O interface 2114 provides connectivity to any suitable circuitry or component such as user interface 115, winding 131, amplifier 145, etc.

Computer readable storage medium 2112 can be any hardware storage resource or device such as memory, optical storage, hard drive, floppy disk, etc. The computer readable storage medium 2112 can be configured to store instructions and/or data used by the fabricator application 146-1 to perform any of the operations as described herein.

Further in this example, communications interface 2117 enables the computer system 2100 and processor 2113 to communicate over a resource such as network 190 to retrieve information from remote sources and communicate with other computers.

As shown, computer readable storage media 2112 is encoded with fabricator application 146-1 (e.g., software, firmware, etc.) executed by processor 2113. Fabricator application 146-1 can be configured to include instructions to implement any of the operations as discussed herein.

During operation, processor 2113 accesses computer readable storage media 2112 via the use of interconnect 2111 in order to launch, run, execute, interpret or otherwise perform the instructions in fabricator application 146-1 stored on computer readable storage medium 2112.

Execution of the fabricator application 146-1 produces processing functionality such as fabricator process 146-2 in processor 2113. In other words, the fabricator process 146-2 associated with processor 2113 represents one or more aspects of executing fabricator application 146-1 within or upon the processor 2113 in the computer system 2100.

Note that computer system 2100 can be a micro-controller device, logic, hardware processor, hybrid analog/digital circuitry, etc., configured to control a power supply and perform any of the operations as described herein.

Functionality supported by the different resources will now be discussed via flowchart 2200 in FIG. 22. Note that the steps in the flowcharts below can be executed in any suitable order.

Figure 22:
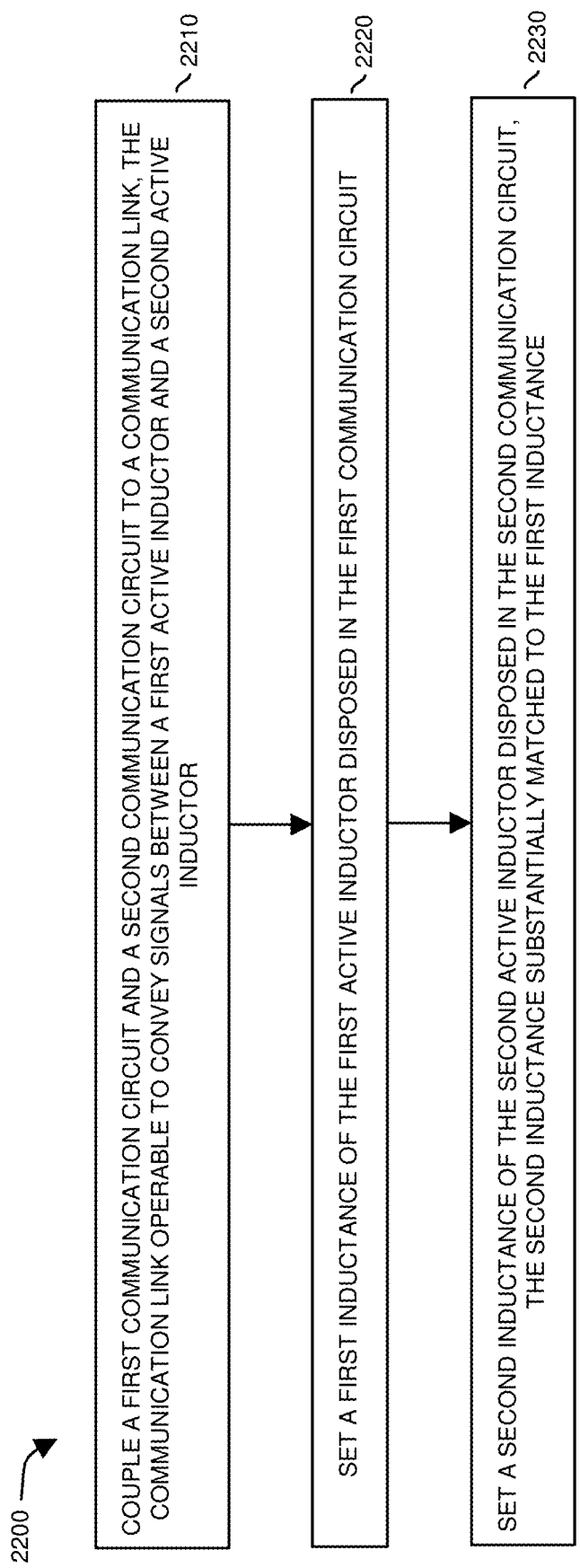
FIG. 22 is an example diagram illustrating of a method as discussed herein.

FIG. 22 is an example diagram illustrating a method of controlling a power converter.

In processing operation 2210, the fabricator 146 couples a first communication circuit 170-1 and a second communication circuit 170-1 to each other via a communication link 127. As previously discussed, the communication link 127 is operable to convey signals 105 between the communication circuit 170-1 and the communication circuit 170-2.

In processing operation 2220, the fabricator 146 or other suitable entity sets a first inductance of a first active inductor

181-1 disposed in the first communication circuit 171-1. The first inductance controls a resonant frequency of communicating the signals from the first communication circuit 171-1 to the second communication circuit 171-2.

In processing operation 2230, the fabricator 146 sets a second inductance of a second active inductor disposed in the second communication circuit 171-2. The second inductance controls/defines a frequency response of a band-pass filter in the second communication circuit 171-2 that receives the signals from the communication circuit 171-1. As discussed herein, it is desirable that the resonant frequency of the transmitter and transmitted signals substantially align with the center frequency or band-pass resonant frequency of the band-pass filter 320. Either or both the carrier frequency of the transmitted signal or the band-pass filter settings can be adjusted to achieve this end.

Note again that techniques herein are well suited for use in communication system supporting conveyance of data. However, it should be noted that the concepts in this disclosure are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

It will be understood by those skilled in the art that various changes in form and details may be made therein without departing from the spirit and scope of the present application as defined by the appended claims. Such variations are intended to be covered by the scope of this present application. As such, the foregoing description of the present application is not intended to be limiting. Rather, any limitations to the invention are presented in the following claims.

The invention claimed is:

1. An apparatus comprising:
   a first communication circuit including a first active inductor set to a first inductance, the first inductance controlling a resonant frequency of communicating signals from the first communication circuit;
   a second communication circuit including a second active inductor set to a second inductance, the second inductance setting a frequency response of a band-pass filter in the second communication circuit; and
   a communication link coupling the first communication circuit and the second communication circuit, the communication link operable to convey the signals between the first communication circuit and the second communication circuit.

2. The apparatus as in claim 1, wherein a setting of the first inductance aligns the resonant frequency of the signals with respect to a center of the band-pass filter.

3. The apparatus as in claim 1, wherein the first active inductor is fabricated to provide the first inductance value via trimming of at least one component in the first active inductor, the first active inductor controlling a resonant frequency of transmitting the signals over the communication link; and
   wherein the second active inductor is fabricated to provide the second inductance value via trimming of at least one component in the second active inductor, the second active inductor controlling settings of the band-pass filter disposed in the second communication circuit.

4. The apparatus as in claim 1, wherein a length of the communication link disposed between the first communication circuit and the second communication circuit is less than 5 inches.

5. The apparatus as in claim 1, wherein the first inductance of the first active inductor defines a resonant frequency of a transmitter of the first communication circuit coupled to the communication link; and
   wherein the second inductance of the second active inductor defines frequency settings of the band pass filter in the second communication circuit, the apparatus further comprising:
   an envelope detector operative to convert a filtered signal received from the band-pass filter into an output signal, the output signal being a replica of an input signal inputted to the transmitter of the first communication circuit.

6. The apparatus as in claim 1, wherein the second inductance is substantially equal to the first inductance; and
   wherein the second active inductor is configured in a same manner as the first active inductor.

7. The apparatus as in claim 1, wherein the first active inductor includes a first set of transconductance amplifiers operative to provide the first inductance; and
   wherein the second active inductor includes a second set of transconductance amplifiers to provide the second inductance.

8. The apparatus as in claim 1, wherein the first communication circuit and the second communication circuit are coupled to a common substrate.

9. The apparatus as in claim 1, wherein the first communication circuit and corresponding circuit components including the first active inductor are galvanically isolated with respect to the second communication circuit and corresponding circuit components including the second active inductor.

10. The apparatus as in claim 1, wherein the first communication circuit is a first transceiver operative to transmit/receive signals over the communication link; and
wherein the second communication circuit is a second transceiver operative to transmit/receive the signals over the communication link.

11. The apparatus as in claim 1, wherein the signals are differential signals; and
wherein the communication link includes a pair of conductive paths extending between the first communication circuit and the second communication circuit, the pair of conductive paths operable to convey the differential signals.

12. The apparatus as in claim 11, wherein the pair of conductive paths includes a first conductive path and a second conductive path extending between the first communication circuit and the second communication circuit; and
wherein the first inductance and the second inductance are disposed in series along the first conductive path.

13. The apparatus as in claim 12, wherein the first communication circuit includes a third active inductor set to a third inductance;
wherein the second communication circuit includes a fourth active inductor set to a fourth inductance, the fourth inductance substantially matched to the third inductance; and
wherein the third inductance and the fourth inductance are disposed in series along the second conductive path.

14. The apparatus as in claim 1, wherein the first communication circuit is fabricated on a first semiconductor chip; and
wherein the second communication circuit is fabricated on a second semiconductor chip.

15. A method comprising:
coupling a first communication circuit and a second communication circuit to a communication link, the communication link operable to convey signals between the first communication circuit and the second communication circuit,
setting a first inductance of a first active inductor disposed in the first communication circuit, the first inductance controlling a resonant frequency of communicating the signals from the first communication circuit to the second communication circuit; and
setting a second inductance of a second active inductor disposed in the second communication circuit, the second inductance setting a frequency response of a band-pass filter in the second communication circuit that receives the signals.

16. The method as in claim 15, wherein a setting of the first inductance aligns the resonant frequency of the signals with respect to a peak frequency passed by the band-pass filter.

17. The method as in claim 15 further comprising:
fabricating the length of the communication link disposed between the first communication circuit and the second communication circuit to be less than 5 inches.

18. The method as in claim 15 further comprising:
affixing the first communication circuit and the second communication circuit to a common substrate.

19. The method as in claim 18, wherein a magnitude of the resonant frequency of a transmitter communicating the signals is within 5% of a magnitude of a band-pass resonant frequency of the band-pass filter.

20. The method as in claim 14 further comprising:
providing galvanic isolation between the first communication circuit and the second communication circuit.

\* \* \* \* \*